US008149800B2

(12) United States Patent
Sawada

(10) Patent No.: US 8,149,800 B2
(45) Date of Patent: Apr. 3, 2012

(54) COMMUNICATION METHOD, CONTROL STATION, AND COMMUNICATION APPARATUS

(75) Inventor: Tetsuya Sawada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 11/612,061

(22) Filed: Dec. 18, 2006

(65) Prior Publication Data

US 2007/0140197 A1 Jun. 21, 2007

(30) Foreign Application Priority Data

Dec. 20, 2005 (JP) ................................ 2005-367193

(51) Int. Cl.
*H04W 4/00* (2009.01)
(52) U.S. Cl. ........ 370/338; 370/328; 370/331; 370/332; 455/422.1; 455/445; 455/136
(58) Field of Classification Search .................. 370/338, 370/328, 331–335; 455/422.1, 445, 136–444, 455/452.2, 67.11, 524–525, 502–509
See application file for complete search history.

(56) References Cited

U.S. PATENT DOCUMENTS

| | | | | |
|---|---|---|---|---|
| 5,621,732 | A | 4/1997 | Osawa | 370/79 |
| 5,995,500 | A * | 11/1999 | Ma et al. | 370/337 |
| 6,047,178 | A * | 4/2000 | Frlan | 455/423 |
| 6,744,750 | B1 | 6/2004 | Berger | |
| 6,791,996 | B1 | 9/2004 | Watanabe et al. | |
| 7,263,361 | B2 * | 8/2007 | Taylor | 455/450 |
| 7,522,571 | B2 * | 4/2009 | Ginzburg | 370/338 |
| 7,542,452 | B2 * | 6/2009 | Penumetsa | 370/338 |
| 2004/0121766 | A1 * | 6/2004 | Benson et al. | 455/425 |
| 2004/0240405 | A1 | 12/2004 | Okazaki | 370/315 |
| 2004/0246934 | A1 * | 12/2004 | Kim | 370/338 |
| 2005/0036469 | A1 * | 2/2005 | Wentink | 370/338 |
| 2005/0287982 | A1 * | 12/2005 | Brewer et al. | 455/405 |
| 2006/0209891 | A1 * | 9/2006 | Yamada et al. | 370/468 |
| 2006/0270415 | A1 * | 11/2006 | Waxman | 455/452.2 |
| 2007/0008922 | A1 * | 1/2007 | Abhishek et al. | 370/329 |
| 2007/0171936 | A1 * | 7/2007 | Hazra et al. | 370/465 |

FOREIGN PATENT DOCUMENTS

| | | |
|---|---|---|
| JP | 07-288542 | 10/1995 |
| JP | 2001-045027 | 2/2001 |
| JP | 2001-160813 A | 6/2001 |
| JP | 2001-197571 A | 7/2001 |
| JP | 2003-348103 A | 12/2003 |
| JP | 2004-128785 A | 4/2004 |
| JP | 2004-320396 | 11/2004 |
| JP | 2004-363645 | 12/2004 |
| JP | 2005-086234 A | 3/2005 |

OTHER PUBLICATIONS

The above references were cited in a Jul. 8, 2011 Japanese Office Action, which is enclosed without an English Translation, that issued in Japanese Patent Application No. 2005-367193.

* cited by examiner

*Primary Examiner* — Kamran Afshar
*Assistant Examiner* — Marisol Fahnert
(74) *Attorney, Agent, or Firm* — Cowan, Liebowitz & Latman, P.C.

(57) ABSTRACT

When a first communication apparatus issues a request for communication quality securement to a control station in order to select communication using a communication path via a control station or communication using a direct communication path between communication apparatuses, it is determined whether the communication partner of the first communication apparatus is a communication apparatus accommodated in the same control station. The control station selects a communication path on the basis of the determination.

5 Claims, 26 Drawing Sheets

FIG. 1B

MANAGEMENT FRAME (HEADER):
  Frame Control,
  Duration,
  DA (DESTINATION MAC ADDRESS),
  SA (SOURCE MAC ADDRESS),
  BSSID,
  Sequence Control DATA FRAME (HEADER):
  Frame Control,
  Duration / ID,
  Address1 (BSSID IS SET WHEN RECEPTION STATION IS BASE STATION, AND DA IS SET WHEN RECEPTION STATION IS TERMINAL STATION),
  Address2 (SA IS SET WHEN RECEPTION STATION IS BASE STATION, AND BSSID IS SET WHEN RECEPTION STATION IS TERMINAL STATION),
  Address3 (DA IS SET WHEN RECEPTION STATION IS BASE STATION, AND SA IS SET WHEN RECEPTION STATION IS TERMINAL STATION),
  Sequence Control,
  Address4 (USED IN WIRELESS DISTRIBUTION SYSTEM)

FIG. 2A

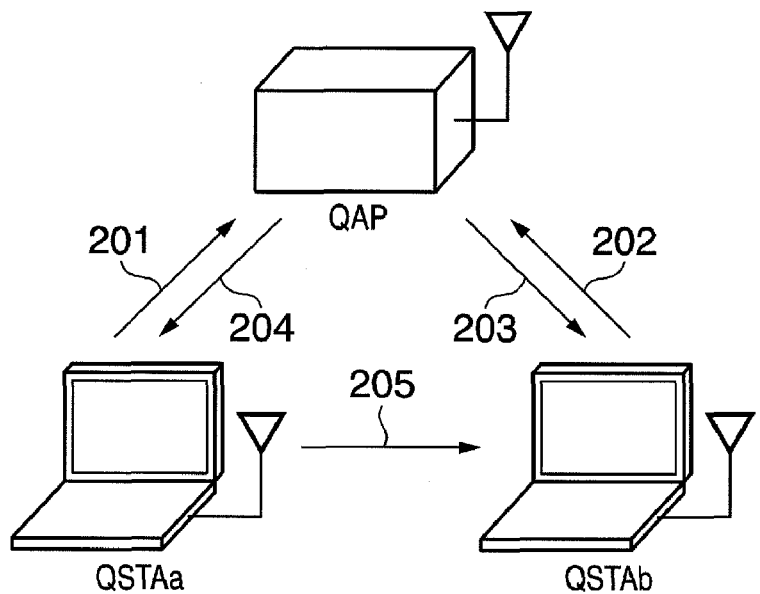

STEP 1 : CAUSE QSTAa TO TRANSMIT DLS Request to QAP (201)
STEP 2 : CAUSE QAP TO TRANSFER DLS Request TO QSTAb WHEN PERMITTING DIRECT LINK (202), CAUSE QAP TO RETURN DLS Response TO QSTAa WHEN NOT PERMITTING DIRECT LINK (204), AND CAUSE PROCESS TO SHIFT TO STEP 5
STEP 3 : CAUSE QSTAb TO TRANSMIT DSL Response TO QAP (203)
STEP 4 : CAUSE QAP TO TRANSFER DLS Response TO QSTAa (204)
STEP 5 : START DATA TRANSMISSION / RECEPTION ONLY WHEN DIRECT LINK IS PERMITTED IN STEP 4 (205)

FIG. 2B

DLS Request FRAME (BODY):
  Category,
  Action,
  Destination MAC Address (DESTINATION MAC ADDRESS),
  Source MAC Address (SOURCE MAC ADDRESS),
  Capability Information,
  DLS Timeout Value,
  Supported rates DLS Response FRAME (BODY):
  Category,
  Action,
  Status Code,
  Destination MAC Address (DESTINATION MAC ADDRESS),
  Source MAC Address (SOURCE MAC ADDRESS),
  Capability Information,
  DLS Timeout Value
  Supported rates STEP 1: CAUSE QSTA TO TRANSMIT ADDTS Request TO QAP (301)
STEP 2: CAUSE QAP TO RETURN ADDTS Response TO QSTA (302)
STEP 3: REPEAT STEPS 1 AND 2 AS NEEDED
STEP 4: CAUSE QAP TO ASSIGN BAND ON THE BASIS OF INFORMATION DETERMINED IN STEPS 1 TO 3, AND CAUSE QSTA TO PERFORM DATA TRANSMISSION / RECEPTION IN ACCORDANCE WITH BAND ASSIGNMENT

FIG. 3B

ADDTS Request FRAME (BODY):
  Category,
  Action,
  Dialog Token,
  TSPEC,
  TCLAS (OPTION),
  TCLAS Processing (OPTION)

ADDTS Response FRAME (BODY):
  Category,
  Action,
  Dialog Token,
  Status Code,
  TS Delay,
  TSPEC,
  TCLAS (OPTION),
  TCLAS Processing (OPTION),
  Schedule

FIG. 4

Traffic Specification (TSPEC) ELEMENT:
  Element ID,
  Length,
  TS Info,
  Nominal MSDU Size,
  Maximum MSDU Size,
  Minimum Service Interval,
  Maximum Service Interval,
  Inactivity Interval,
  Suspension Interval,
  Service Start Time,
  Minimum Data Rate,
  Mean Data Rate,
  Peak Data Rate,
  Burst Size,
  Delay Bound,
  Minimum PHY Rate,
  Surplus Bandwidth Allowance,
  Medium Time TS Info FIELD:
  Traffic Type,
  TSID,
  Direction,
  Access Policy,
  Aggrigation,
  APSD,
  User Priority,
  TSInfo Ack Policy,
  Schedule,
  Reserved

COMMUNICATION METHOD, CONTROL STATION, AND COMMUNICATION APPARATUS

BACKGROUND OF THE INVENTION

1. Field of the Invention

The present invention relates to a communication method, control station, and communication apparatus which are used for a communication system.

2. Description of the Related Art

According to the infrastructure mode defined in IEEE802.11, a communication apparatus serving as a base station accommodates a plurality of wireless terminals serving as terminal stations to construct a network.

FIG. 1A is a view showing the system configuration of the infrastructure mode. FIG. 1B is a view showing the header formats of a management frame and data frame which are exchanged. In this case, when a base station accommodates a terminal station, the terminal station transmits a management frame containing a body format called an association request to the base station. In response to this frame, the base station returns a management frame containing a body format called an association response to the terminal station. When the terminal station stops being accommodated by the base station, the terminal station transmits a management frame containing a body format called disassociation to the base station.

According to the infrastructure mode in IEEE802.11, even terminal stations in the same wireless LAN system transmit/receive data between them through a base station, and hence high efficiency cannot always be achieved in terms of the utilization efficiency of frequencies and communication rate.

Under such situations, IEEE802.11e has proposed a technique of establishing a direct link to allow terminal stations to directly transmit/receive data between them after reaching an agreement through a base station.

FIG. 2A is a view showing a control process (control function) for direct link establishment. FIG. 2B is a view showing the body formats of management frames to be exchanged. This control process for direct link establishment is called DLS (Direct Link Set-up). Management frames (bodies) used in this DLS include a DLS request and a DLS response. A terminal station which is to establish a direct link transmits this DLS request to a base station or the base station transfers the DLS request to a partner terminal station of a direct link. In response to this request, the partner terminal station returns a DLS response to the base station, or the base station transfers it to the terminal station (which has transmitted the DLS request to the base station) which has started DLS. Note that DLS is defined as an option in IEEE802.11e.

There is proposed a technique of suitably using the above direct link by making a transmission station use the direct link when transmitting real-time data, and by making the transmission station use a route via a base station when transmitting another type of data. See, for example, patent reference 1: US 2004240405A1 (Japanese Patent Application Laid-Open No. 2004-363645).

IEEE802.11e has proposed a plurality of extension techniques for securing communication quality (QoS) in addition to the above direct link for improving the utilization efficiency of frequencies and communication rate. According to one of these techniques, a terminal station applies to a base station for information about the flow (traffic stream) of data which the self-station will transmit or receive, and the base station performs traffic control for the overall network on the basis of the information applied from each terminal station. More specifically, traffic control is performed to determine whether to permit data transmission/reception or decide a band assignment time (frequency utilization time).

FIG. 3A is a view showing a control process for QoS securement. FIG. 3B is a view showing the body formats of management frames to be exchanged. This management frame includes an ADDTS request and an ADDTS response. The ADDTS request frame is a frame which is transmitted by a terminal station which wants to secure QoS in data transmission/reception to a base station. The ADDTS response frame is a frame which the base station returns as a response to the terminal station which has transmitted the ADDTS request. The body format of a management frame further comprises an information element called an element, in which information about the flow of data is written. FIGS. 4 and 5 respectively show a traffic specification (TSPEC) element and a traffic classification (TCLAS) element of such elements.

Patent reference 2: U.S. Pat. No. 5,621,732A1 (Japanese Patent Application Laid-Open No. 7-288542), patent reference 3: Japanese Patent Application Laid-Open No. 2001-045027, and patent reference 4: Japanese Patent Application Laid-Open No. 2004-320396 disclose techniques of switching between communication via a base station and direct communication between terminal stations.

According to conventional techniques including IEEE802.11e, control for switching between data transmission/reception via a base station and direct data transmission/reception between terminal stations is independent of control for QoS securement, and do not synchronize with each other. Note that control for QoS securement includes control concerning the application of traffic by a terminal station and traffic control by a base station based on the application.

Assume that when QoS is secured for data transmission/reception while the data transmission/reception is performed via a base station, switching control is performed to perform direct data transmission/reception. This control, however, does not synchronize with control for QoS securement for data transmission/reception after the switching operation.

Furthermore, if transmission terminal stations and reception terminal stations each select data transmission/reception via a base station and apply to the base station for QoS securement concerning the data transmission/reception, the total frequency band of the network exceeds the threshold. The base station therefore does not permit this application, resulting in failure to secure QoS. The traffic in direct data transmission/reception is half that in data transmission/reception via a base station. Therefore, selecting direct data transmission/reception may make it possible to secure QoS.

SUMMARY OF THE INVENTION

It is an object of the present invention to harmonize the utilization efficiency of frequencies with a communication rate and communication quality securement.

It is another object of the present invention to harmonize the utilization efficiency of frequencies with a communication rate and communication quality securement by performing control for switching between communication via a control station and direct communication between communication apparatuses in association with control for communication quality securement.

According to an aspect of the present invention, there is provided a communication method for selection of communication using a communication path via a control station and communication using a direct communication path between communication apparatuses, the method comprising the steps of: when issuing a request for communication quality securement from a first communication apparatus to the control station, determining whether a communication partner of the first communication apparatus is a communication apparatus accommodated in the same control station; and selecting either communication path on the basis of the determination.

According to another aspect of the present invention, there is provided a control station in a system which is configured to perform communication using a communication path via a control station and communication using a direct communication path between communication apparatuses, comprising: a determination unit adapted to, when a first communication apparatus issues a request for communication quality securement, determine whether to accommodate a communication partner of the first communication apparatus; and a selection unit adapted to select either communication path on the basis of determination by the determination unit.

According to still another aspect of the present invention, there is provided a communication apparatus in a system which is configured to perform communication using a communication path via a control station and communication using a direct communication path between communication apparatuses, comprising: a determination unit adapted to determine whether a communication partner is accommodated in the same control station; and a selection unit adapted to select either communication path in accordance with determination by the determination unit.

Further features of the present invention will become apparent from the following description of exemplary embodiments (with reference to the attached drawings).

BRIEF DESCRIPTION OF THE DRAWINGS

FIG. 1B is a view showing the header formats of a management frame and data frame to be exchanged;

FIG. 2A is a view showing a control process (control function) for the establishment of a direct link;

FIG. 2B is a view showing the body formats of management frames to be exchanged;

FIG. 3B is a view showing the body formats of management frames to be exchanged;

FIG. 4 is a view showing a traffic specification (TSPEC) element;

DESCRIPTION OF THE EMBODIMENTS

The best embodiments of the present invention will be described in detail below with reference to the accompanying drawings.

First Embodiment

Figure 6:
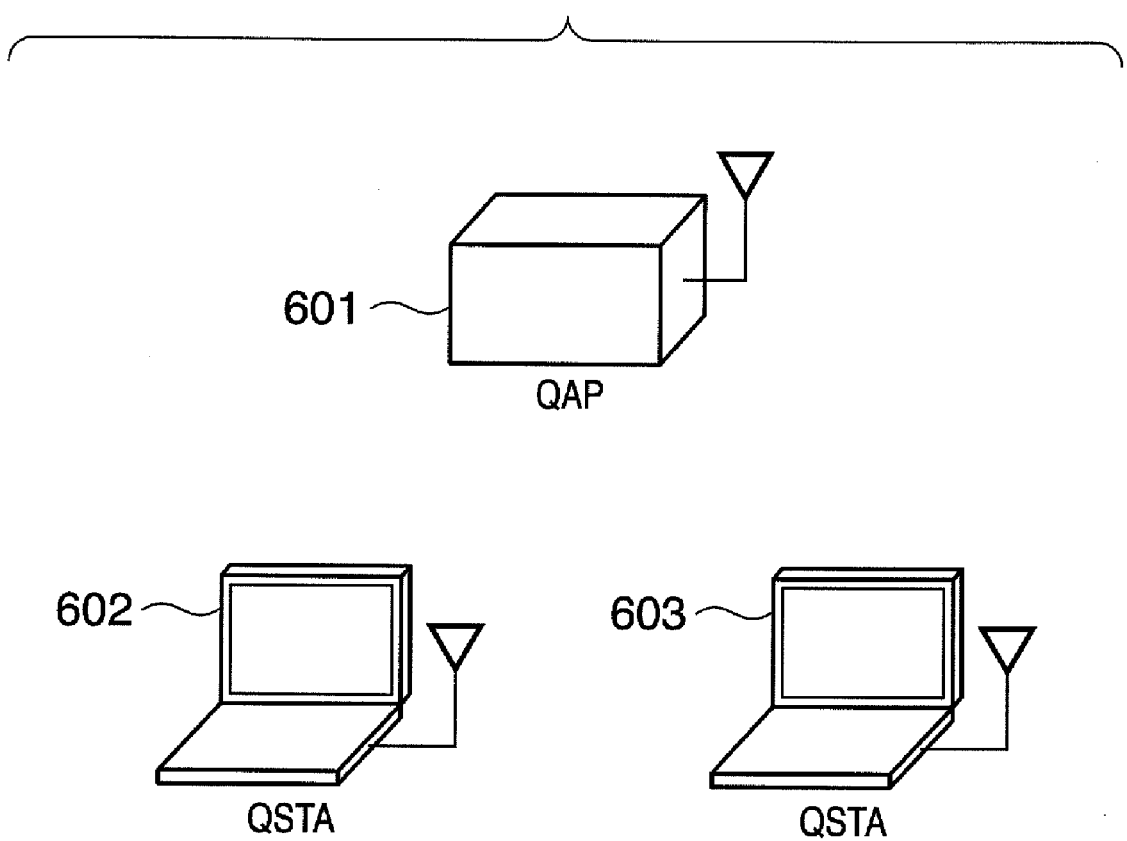
FIG. 6 is a view showing the arrangement of a wireless LAN system to which a wireless communication method according to the first embodiment is applied.

FIG. 6 is a view showing the arrangement of a wireless LAN system to which a wireless communication method according to the first embodiment is applied. Reference numeral 601 denotes a base station (QAP), which comprises an extended wireless LAN communication function defined in IEEE802.11 and IEEE802.11e, a wired LAN communication function defined in IEEE802.3, and a relay function between the wireless LAN and the wired LAN.

Figure 1A:
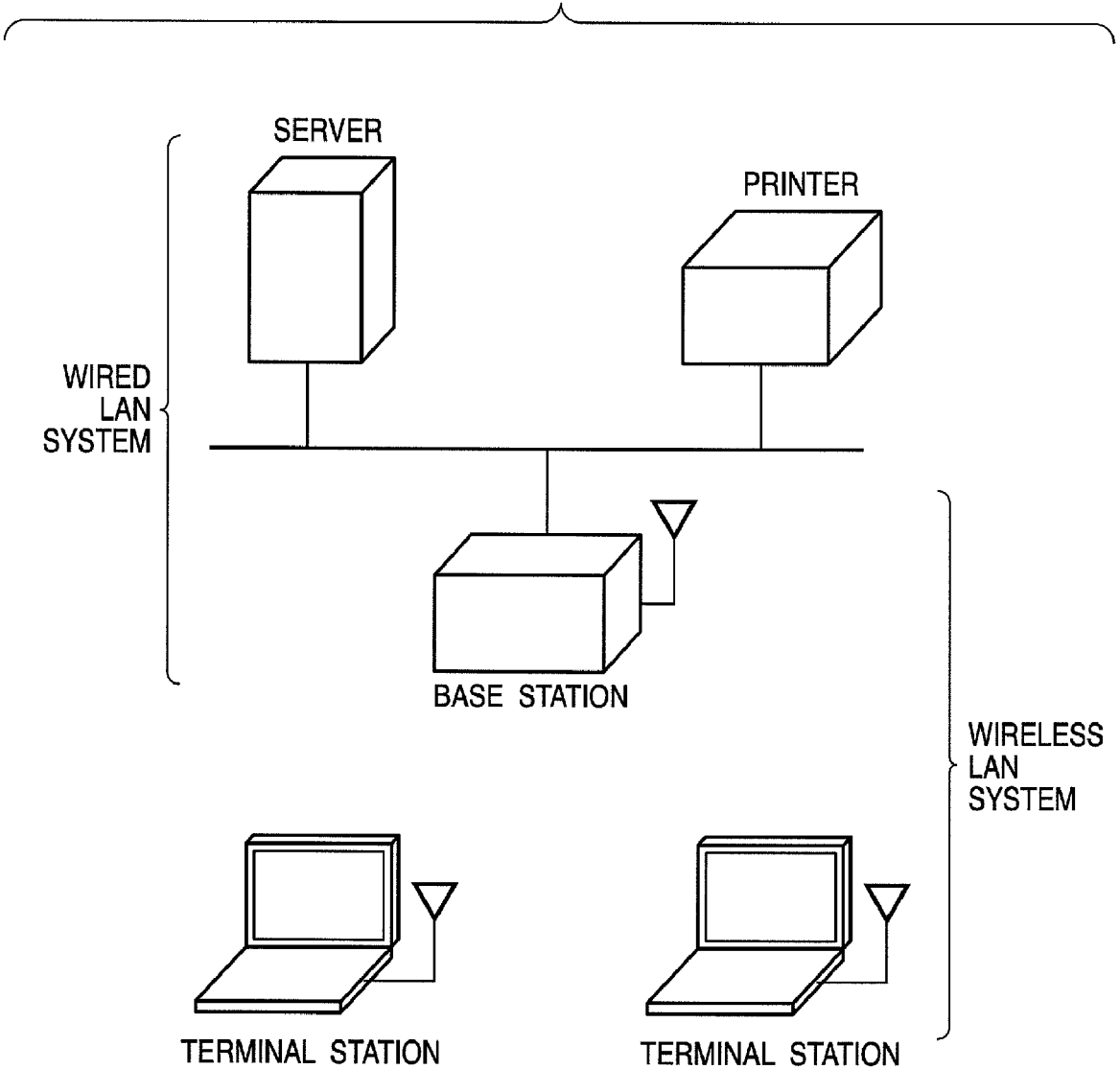
FIG. 1A is a view showing the system configuration of an infrastructure mode.

Reference numeral 602 and 603 denote terminal stations (QSTAs), each of which comprises the wireless LAN communication function defined in IEEE802.11 and IEEE802.11e. The terminal stations 602 and 603 are accommodated by the base station 601 by making association therewith using the wireless LAN communication functions. The terminal stations 602 and 603 can perform data transmission/reception via the base station 601, and can perform data transmission/reception with devices existing on the wired LAN to which the base station 601 connects (i.e., devices corresponding to the server and printer shown in FIG. 1A).

Figure 3A:
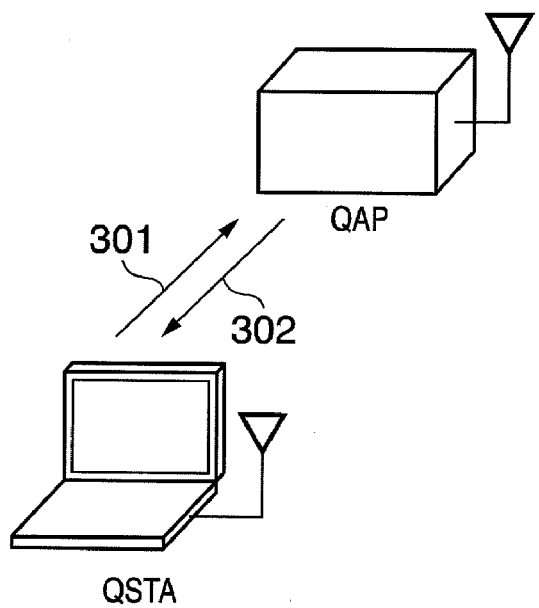
FIG. 3A is a view showing a control process for QoS securement.

In this case, the base station 601 and the terminal stations 602 and 603 each comprise a function for securing communication quality (QoS) which is defined in IEEE802.11e. With this function, performing the control shown in FIG. 3A allows the terminal stations 602 and 603 to perform data transmission/reception while securing QoS.

The base station 601 and the terminal stations 602 and 603 each have a DLS function defined as an option in IEEE802.11e. With this function, performing the control shown in FIG. 2A allows the terminal stations 602 and 603 to perform data transmission/reception via a communication path without the base station 601.

[Internal Arrangement]

The internal arrangements of the base station 601 and terminal station 602 will be described next with reference to FIGS. 7A and 7B. Note that the internal arrangement of the terminal station 603 is the same as that of the terminal station 602, and hence a description thereof will be omitted.

Figure 7A:
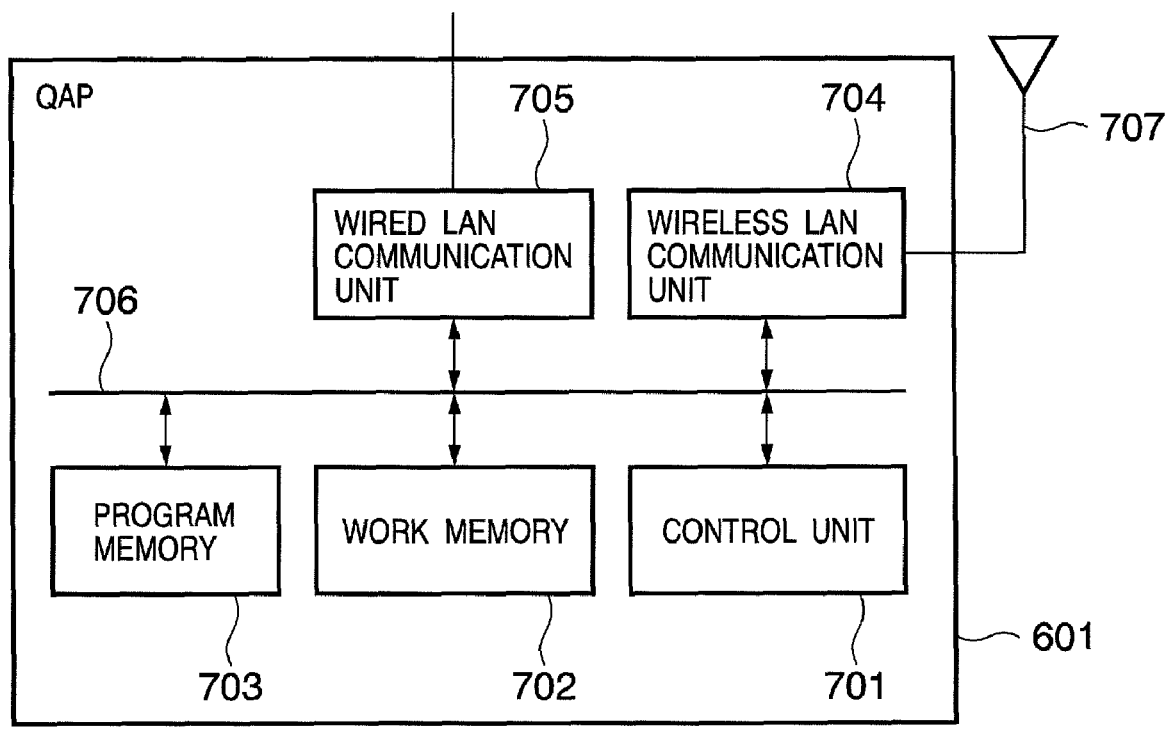
FIG. 7A is a block diagram showing an example of the internal arrangement of a base station 601.

Referring to FIG. 7A, reference numeral 701 denotes a control unit which controls the overall operation of the QAP 601 and comprises a CPU (Central Processing Unit) and its peripheral circuits; 702, a work memory which is used by the control unit 701 when it executes various control operations in accordance with control programs and comprises a RAM (Random Access Memory; and 703, a program memory which stores a control program group including control programs for providing a wireless LAN communication function, wired LAN communication function, and relay function, and comprises a ROM (Read Only Memory).

Reference numeral 704 denotes a wireless LAN communication unit which provides the extended wireless LAN communication function defined in IEEE802.11 and IEEE802.11e and comprises a wireless LAN chip for controlling wireless communication and an antenna 707; 705, a wired LAN communication unit which provides the wired LAN function defined in IEEE802.3 and comprises a wired LAN chip and a cable connector; and 706, a system bus which connects the control unit 701, work memory 702, program memory 703, wireless LAN communication unit 704, and wired LAN communication unit 705.

Figure 7B:
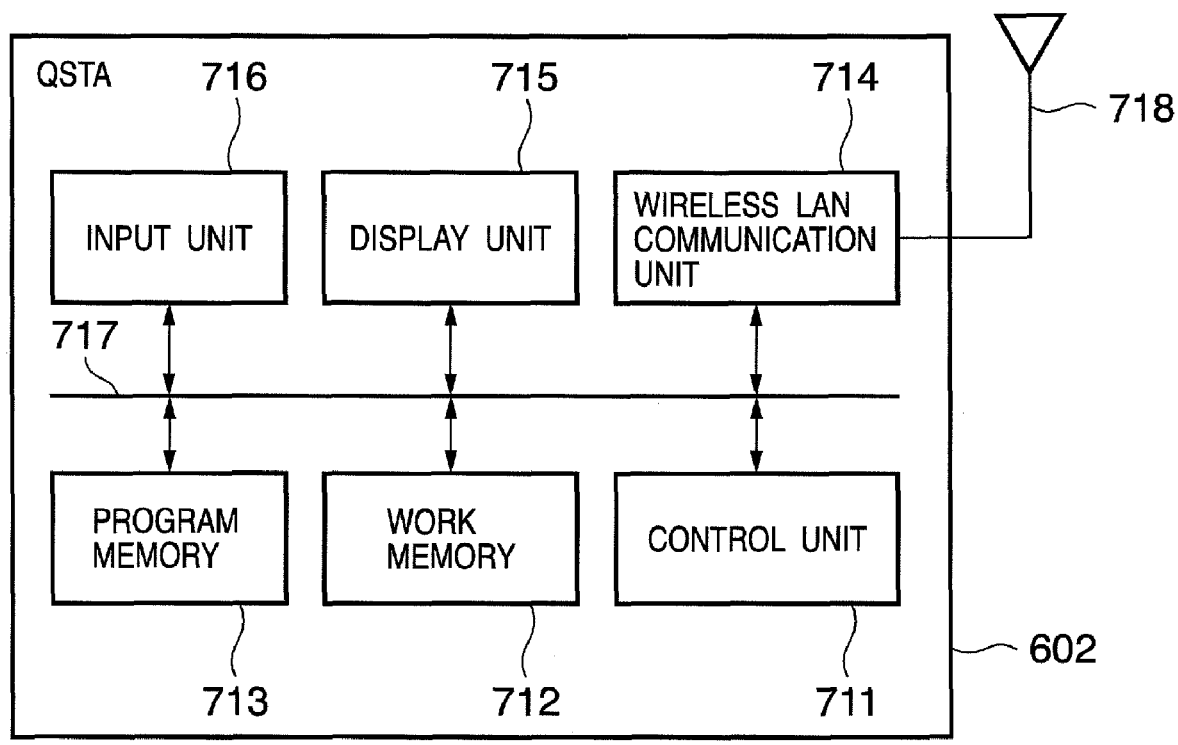
FIG. 7B is a block diagram showing an example of the internal arrangement of a terminal station 602.

Referring to FIG. 7B, reference numeral 711 denotes a control unit which controls the overall operation of the terminal station 602 and comprises a CPU (Central Processing Unit) and its peripheral circuits; 712, a work memory which is used by the control unit 711 when it executes various control operations in accordance with control programs and comprises a RAM (Random Access Memory); and 713, a program memory which stores a control program group including a control program for providing a wireless LAN communication function, and comprises a ROM (Read Only Memory).

Reference numeral 714 denotes a wireless LAN communication unit which provides the wireless LAN communication function defined in IEEE802.11 and IEEE802.11e and comprises a wireless LAN chip for controlling wireless communication and an antenna 718; 715, a display unit which performs screen display for the user and comprises a TFT (Thin Film Transistor) liquid crystal panel; 716, an input unit which receives an instruction from the user and comprises an array of keys assigned to characters and instructions; and 717, a system bus which connects the control unit 711, work memory 712, program memory 713, wireless LAN communication unit 714, display unit 715, and input unit 716.

[Event and Table Arrangement]

Association processing, ADDTS processing, and a table addition event and table deletion event issued from DLS processing to table processing in the base station 601 will be described with reference to FIGS. 8A and 8B.

Figure 8A:
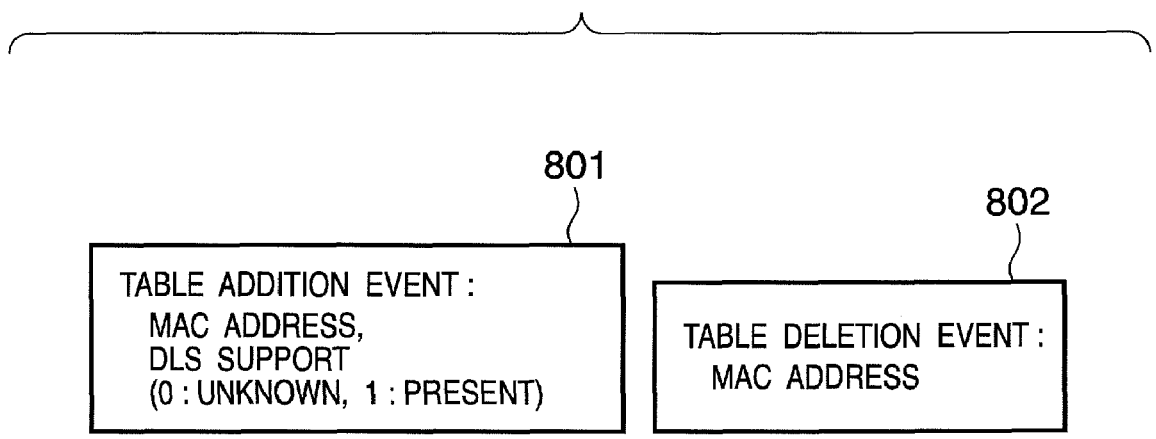
FIG. 8A is a view showing examples of the arrangements of a table addition event and table deletion event.

FIG. 8A is a view showing examples of a table addition event and a table deletion event. FIG. 8B is a view showing an example of a table created by table processing. Reference numeral 801 denotes a table addition event, which comprises a MAC address field and a DLS (Direct Link Set-up) support field. The MAC address of a terminal station is recorded in the MAC field. When it is known that the terminal station supports DLS, "1" is recorded in the DLS support field. If it is not known, "0" is recorded in this field. Note that when information about a terminal station is to be added to a table 803 or information about a terminal station in the table 803 is to be updated, each process to be described below issues this table addition event to table processing.

Reference numeral 802 denotes a table deletion event, which comprises a MAC address field. The MAC address of a terminal station is recorded in the MAC address field. When information about a terminal station is to be deleted from the table, association processing to be described later issues this table deletion event to table processing (to be described later).

The table 803 comprises an array structure having two members, namely a MAC address and a DLS support. The MAC address of a terminal station is registered in the MAC address member, and "present" or "unknown" is registered in the DLS support member. This allows the base station to determine the MAC address of a terminal station which the self-station accommodates and determine whether it is known that the terminal station supports DLS.

Note that the first embodiment uses a MAC address to identify a terminal station in the table addition event 801, table deletion event 802, and table 803. However, the embodiment may use another identification information to identify a terminal station. In addition, the first embodiment uses a DLS support to record in accordance with identification information, but may use another information. For example, the embodiment may record the above information together with a history indicating whether a direct link has actually been established. Changing DLS processing to be described later makes it possible to easily implement this operation.

[Table Processing]

Figure 9:
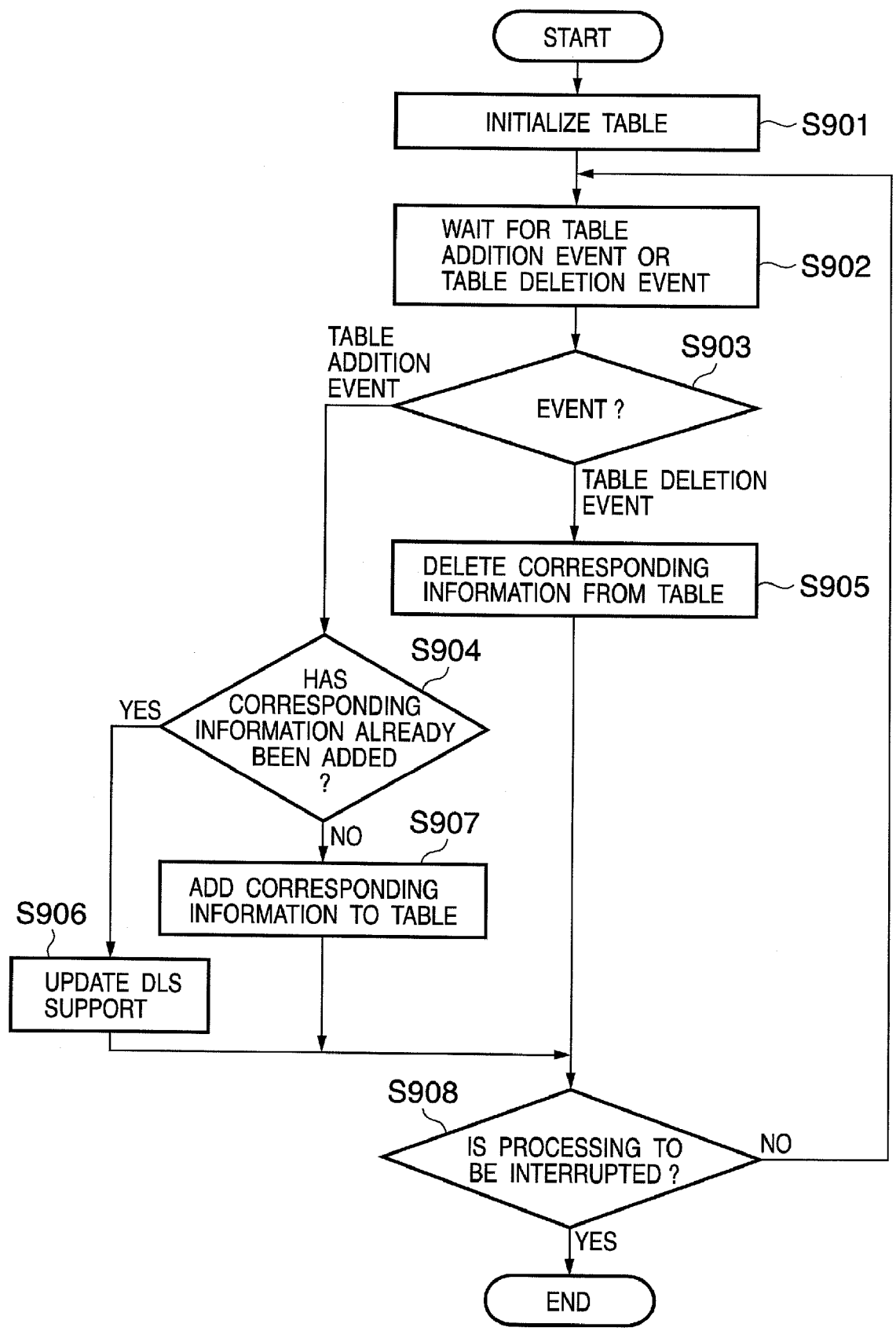
FIG. 9 is a flowchart showing table processing in the base station 601.

Table processing in the base station 601 in the above arrangement will be described with reference to FIG. 9. The base station 601 performs this table processing to create the table 803 and process the table 803 in accordance with association processing, ADDTS processing, and the table addition event 801 or the table deletion event 802 from DLS processing, which will described later. In addition, when initializing the wireless LAN communication function, the control unit 701 of the base station 601 starts table processing.

Figure 8B:
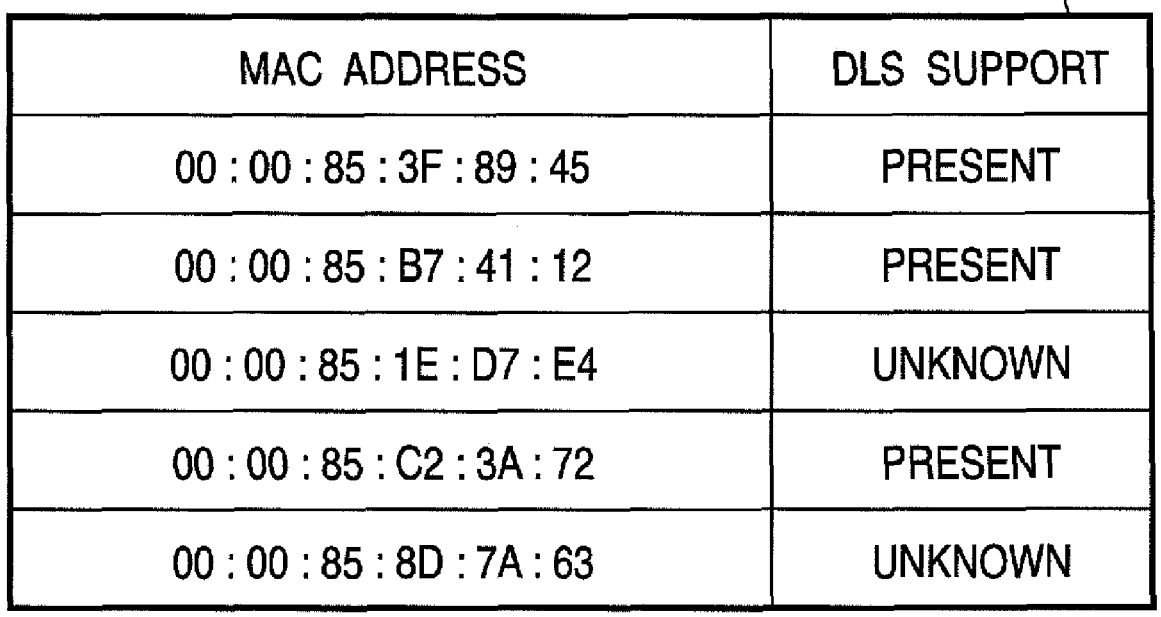
FIG. 8B is a view showing an example of a table created by table processing.

First of all, when the control unit 701 starts table processing, the process shifts to step S901 to initialize the table 803 shown in FIG. 8B and create an empty table. In this case, the table 803 contains no entry for a terminal station. In step S902, the control unit 701 waits for each process to issue the table addition event 801 or the table deletion event 802. If any one of the events is issued, the process shifts to step S903 to discriminate the type of event issued. If the table addition event 801 is issued, the process shifts to step S904. If the table deletion event 802 is issued, the process shifts to step S905.

In step S904, the control unit 701 searches for a MAC address in the table 803 on the basis of the MAC address in the MAC address field of the table addition event 801, and determines whether the terminal station designated by the event exists in the table 803. If YES in step S904, the process shifts to step S906. If NO in step S904, the control unit 701 determines that the corresponding information is to be newly added to the table, and the process shifts to step S907.

In step S905, as in the case of the table addition event 801, the control unit 701 searches for a MAC address in the table 803 on the basis of the MAC address, and deletes an entry comprising the corresponding MAC address and a DLS support from the table 803. With this operation, the control unit 701 deletes the terminal station designated by the table deletion event 802 from the table 803 and determines that the station is not a terminal station which the self-station accommodates.

Upon determining in step S904 that the corresponding information has already been added, the control unit 701 updates the DLS support member in the already existing entry (comprising a MAC address member and a DLS support member) in step S906. Therefore, referring to the table 803 makes it possible to refer to the latest DLS support condition.

Upon determining in step S904 that the corresponding information is to be newly added, the control unit 701 adds a combination of the MAC address field and DLS support field of the table addition event 801 as a new entry to the table 803. Therefore, adding the terminal station designated by the table addition event 801 to the table allows the base station to discriminate the terminal station which the self-station accommodates by referring to the table 803.

Upon completion of the above processing, the process shifts to step S908 to determine whether the table processing is to be interrupted due to an error or the stoppage of the wireless LAN communication function. If YES in step S908, the processing is terminated. If NO in step S908, the process returns to step S902 to repeat this table processing.

[Association Processing]

The processing of making the base station 601 issue the table addition event 801 or the table deletion event 802 in accordance with association requests or disassociation requests from the terminal stations 602 and 603 will be described next with reference to FIG. 10.

Figure 10:
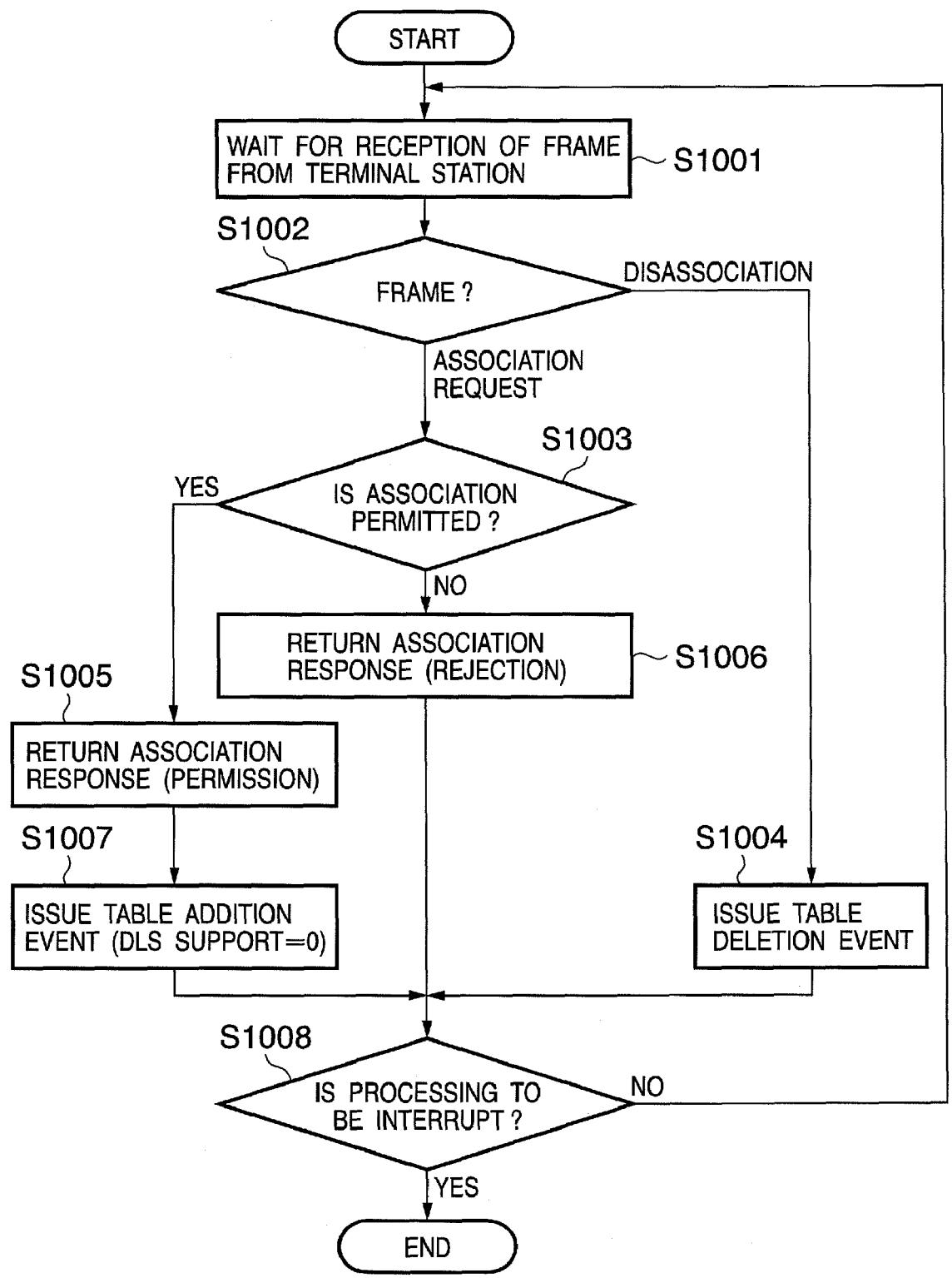
FIG. 10 is a flowchart showing association processing in the first embodiment.

FIG. 10 is a flowchart showing association processing in the first embodiment. The control unit 701 of the base station 601 executes this processing at the time of initialization of the wireless LAN communication function following the start of table processing.

First of all, when the control unit 701 starts association processing, the flow shifts to step S1001 to wait for the reception of association request frames or disassociation frames from the terminal stations 602 and 603 via the wireless LAN communication unit 704. When the base station 601 receives any of such frames, the process shifts to step S1002 to discriminate the received frame. If the base station 601 receives an association request frame, the process shifts to step S1003 to determine whether to permit the association request from the terminal station indicated by the source address contained in the header of the frame. If the control unit 701 determines that the request is permitted, the process shifts to step S1005 to transmit an association response frame containing a status code representing the permission to the terminal station of the source address. In step S1007, the control unit 701 sets the source address in the MAC address field of the table addition event 801, and issues the table addition event 801 having "0 (unknown)" set in the DLS support field with respect to table processing.

In this case, in order to reflect in the table 803 the state wherein the base station accommodates the terminal station, the control unit 701 issues the table addition event 801 containing the MAC address of the accommodated terminal station and the DLS support indicating "unknown" because the support of DLS is not known.

If the control unit 701 determines in step S1003 that the request is not permitted, the process shifts to step S1006 to transmit an association response frame containing a status code indicating rejection to the terminal station of the source address. In this case, the base station does not accommodate the terminal station which has transmitted the association request frame.

If the base station 601 receives a disassociation frame in step S1002, the process shifts to step S1004. In step S1004, the control unit 701 issues, to table processing, the table deletion event 802 in which the source address contained in the header of the disassociation frame is set in the MAC address field. The table deletion event 802 can reflect, in the table 803, the state wherein the base station 601 stops accommodating the terminal station.

Upon completion of the above processing, the process shifts to step S1008 to determine whether to stop association processing due to an error or the stoppage of the wireless LAN communication function. If the control unit 701 determines to stop the processing, the processing is terminated. Otherwise, the process returns to step S1001 to repeat this association processing.

[ADDTS Processing]

The processing of making the base station 601 receive an ADDTS request frame from a terminal station and perform control concerning QoS securement in data transmission/reception performed by the terminal station will be described next with reference to FIG. 11.

Figure 11A:
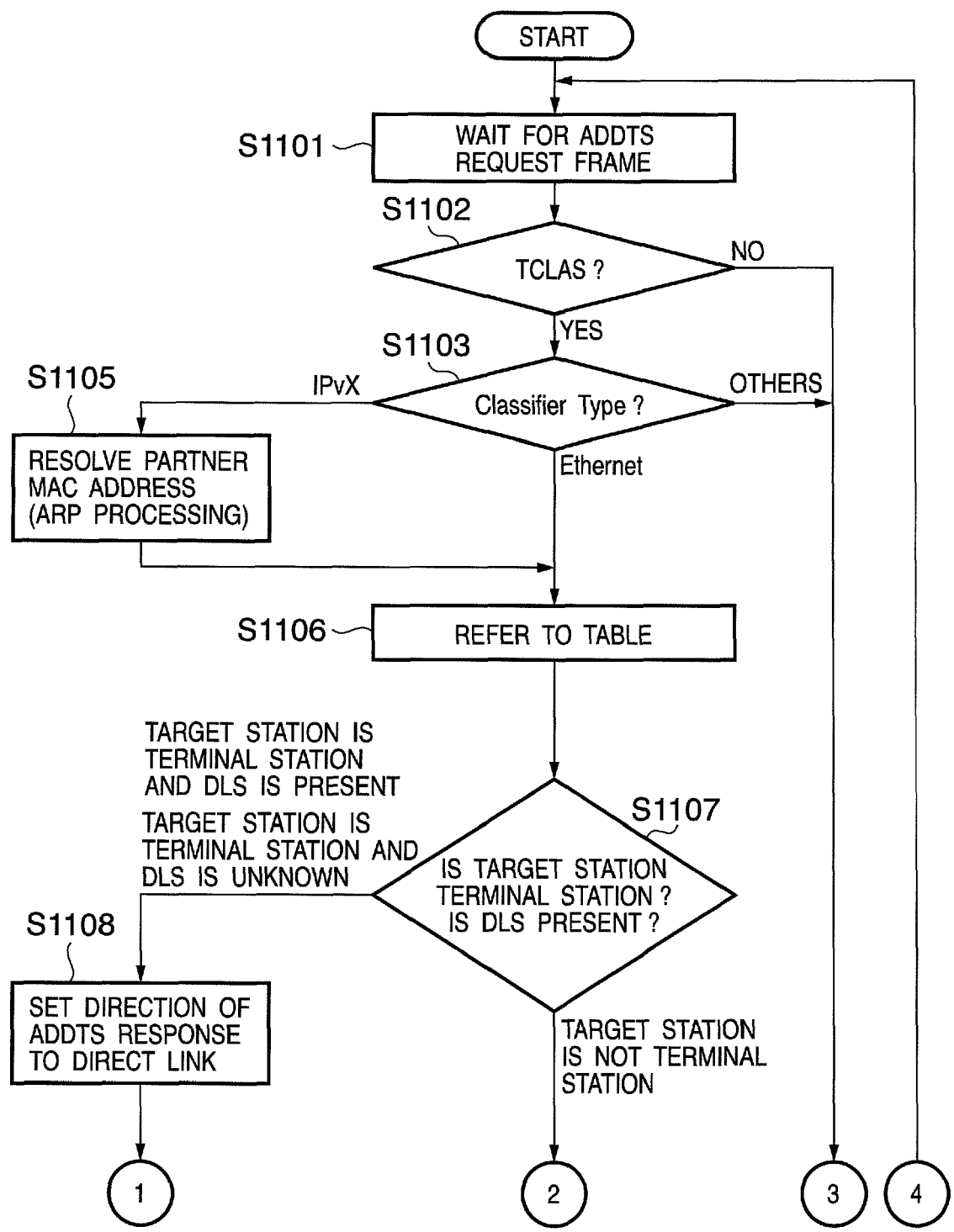
FIGS. 11A and 11B are flowcharts showing ADDTS processing in a base station in the first embodiment.
Figure 11B:
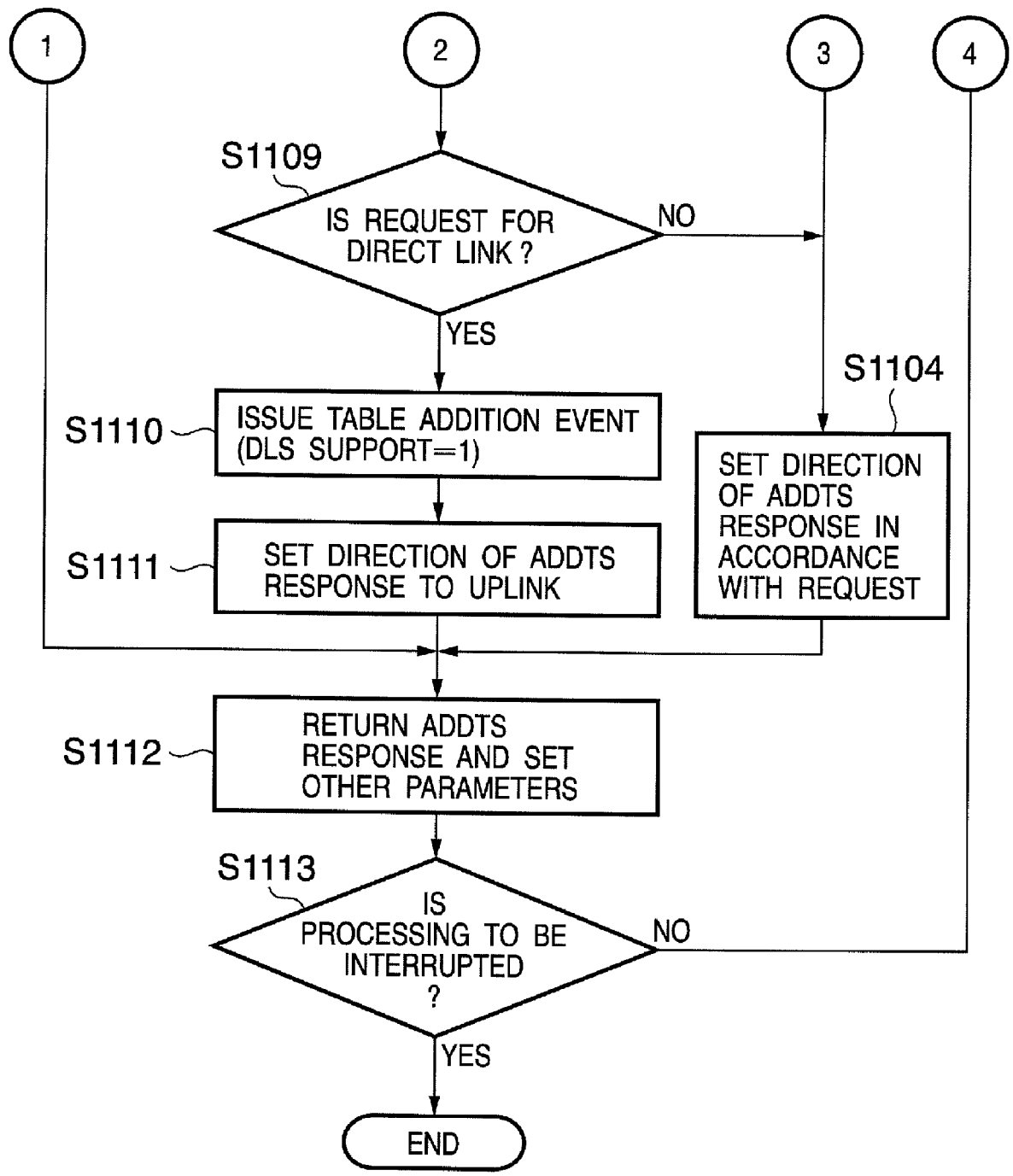

FIGS. 11A and 11B are flowcharts showing ADDTS processing in a base station in the first embodiment. The control unit 701 of the base station 601 executes this processing at the time of initialization of the wireless LAN communication function following the start of association processing.

Figure 5:
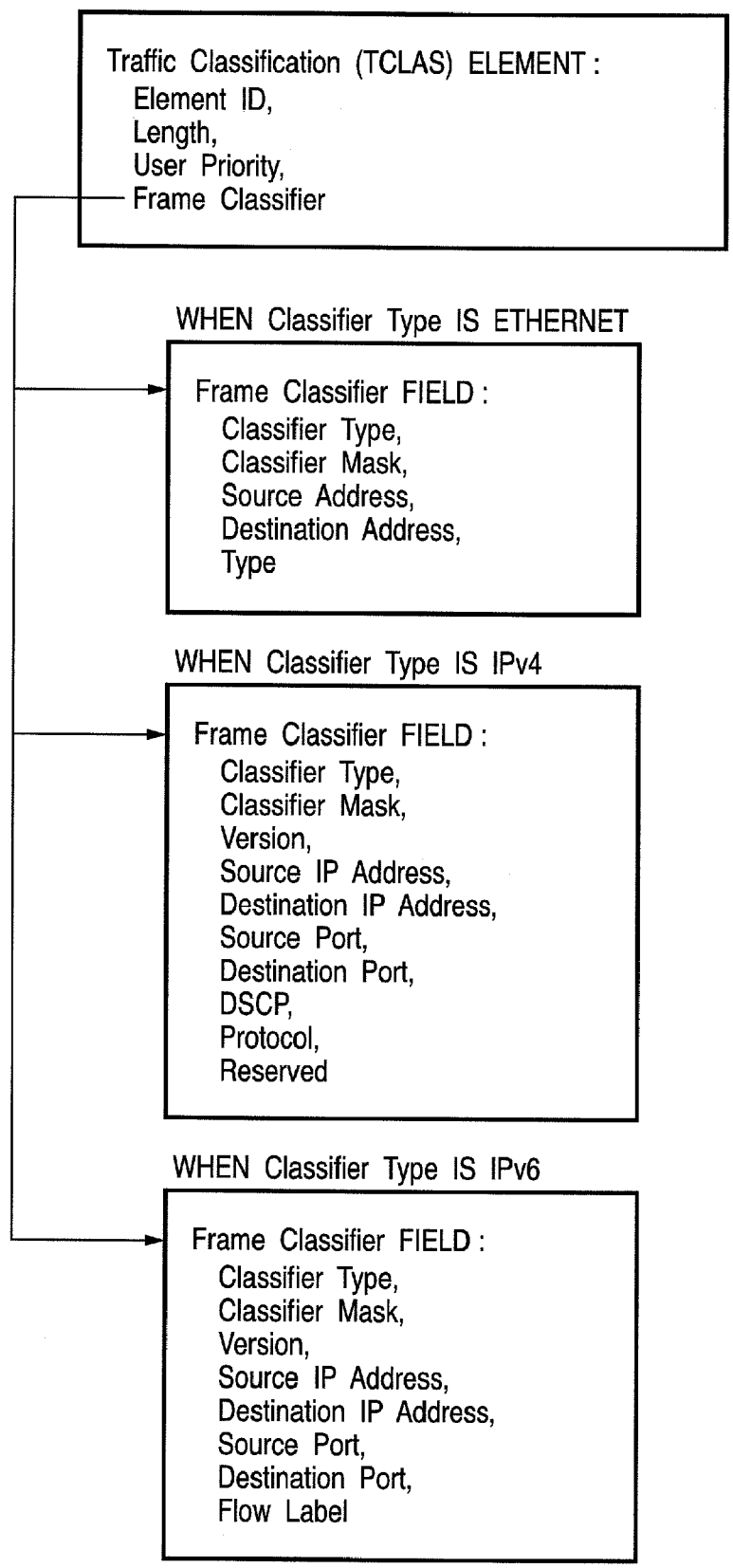
FIG. 5 is a view showing a traffic classification (TCLAS) element.

First of all, when the control unit 701 starts ADDTS processing, the process shifts to step S1101 to wait for the reception of an ADDTS request frame from a terminal station via the wireless LAN communication unit 704. Subsequently, when the base station 601 receives a frame, the process shifts to step S1102 to determine whether a TCLAS element as an option exits in the ADDTS request frame. In this case, the TCLAS element (FIG. 5) is an information element indicating the type of traffic and contains a destination address. If no TCLAS element exists, since the control unit 701 cannot determine whether a station with which data transmission/reception should be performed while QoS is secured is an entry terminal station (a terminal station which the base station 601 accommodates) in the table 803, the process advances to step S1104. In step S1104, the control unit 701 sets the direction parameter of the TSPEC element contained in an ADDTS response frame to be returned in accordance with the request contained in the ADDTS request frame. In this case, the TSPEC element (FIG. 4) is an information element indicating a traffic specification, and contains a direction parameter as a parameter in the transmitting direction of the data (upstream, downstream, bidirection via the base station, or direct link).

If the control unit 701 determines in step S1102 that a TCLAS element exists, the process shifts to step S1103 to determine whether a station with which data transmission/reception should be performed while QoS is secured is an entry terminal station in the table 803, the process advances to step S1103. In step S1103, the control unit 701 analyzes "Classifier Type" in the frame classifier field of the TCLAS element, and causes a branch in accordance with the type. If the communication protocol is IPv4 or IPv6, the flow shifts to step S1105. If the protocol is Ethernet (registered trademark), the process shifts to step S1106. Otherwise, the process shifts to step S1104. Note that in the case of Ethernet (registered trademark), the destination address in the frame classifier field of the TCLAS element is a MAC address.

In step S1105, the control unit 701 performs ARP (Address Resolution Protocol) from the destination IP address in a frame classifier field and acquires the MAC address of the partner terminal station corresponding to the set destination IP address. In step S1106, the control unit 701 compares the partner station specified by the MAC address with the entry terminal station (written by a MAC address) in the table 803.

In step S1107, the control unit 701 determines whether the terminal station whose MAC address is specified in step S1106 is entered in the table 803 and DLS support is known. In the case of an entry terminal station (including a case wherein it is known that DLS support is present and a case wherein DLS support is not known), the process shifts to step S1108. Although this determination is performed depending on whether the terminal station is an entry terminal station regardless of the presence/absence of DLS support, the determination may be performed in consideration of DLS support.

In step S1108, the control unit 701 sets the direction parameter of the TSPEC element to be contained in an ADDTS response frame to a direct link. In this case, the control unit 701 determines that entry terminal stations are to perform data transmission/reception requiring QoS securement, and returns the ADDTS response frame in which the direct link has been set as a proposal from the self-station. That is, when these terminal stations are to perform data transmission/reception, the base station 601 determines that a direct link is most effective in terms of the utilization efficiency of frequencies and communication rate.

The terminal station which has received the ADDTS response frame in which the direction parameter of the TSPEC element is set to a direct link can try DLS with a data transmission/reception partner by retransmitting an ADDTS request frame.

In the first embodiment, in the case of communication with an entry terminal station, a reply is set to a direct link regardless of whether a request is received from a terminal station. Such setting may be made in consideration of a request from a terminal station. For example, if a request is set to a downlink, a replay is set to the downlink. Otherwise, a replay is set to a direct link in consideration of the request from the terminal station.

If the control unit 701 determines in step S1107 that the station is not an entry terminal station, the process shifts to step S1109 to determine whether the direction parameter of the TSPEC element contained in the ADDTS request frame is a direct link. If NO in step S1109, the process shifts to step S1104 described above. If YES in step S1109, the process shifts to step S1110 to issue the table addition event 801. More specifically, the control unit 701 sets the source address (the MAC address of the terminal station which has transmitted the ADDTS request frame) contained in the ADDTS request frame (header) in the MAC address field, and sets "1 (present)" in the DLS support field.

The control unit 701 performs this processing to determine that the terminal station which has transmitted the ADDTS request frame in which the direction parameter of the TSPECT element is set to a direct link supports DLS, and to reflect the corresponding information in the table 803.

In step S1111, the control unit 701 sets the direction parameter of TSPEC to be contained in an ADDTS response frame to an uplink. The control unit 701 performs this processing to return the ADDTS response frame, in which an uplink is set, as a proposal from the self-station to the terminal station which has transmitted the ADDTS request frame set to a direct link in spite of not performing data transmission/reception between entry terminal stations.

Note that in the first embodiment, providing a proposal for an uplink leaves a possibility that a terminal station can perform data transmission/reception with QoS being secured. However, the control unit 701 may set an ADDTS response frame indicating rejection without providing any proposal. In this case, the base station will reject QoS securement in data transmission/reception between terminal stations. This, however, will avoid any useless trial to secure QoS for a direct link which cannot be established.

Upon completion of setting for the above ADDTS response frame, the process shifts to step S1112 to set other parameters of the ADDTS response frame in consideration of the direction parameter set in the preceding processing and the overall traffic of the network. In this case, it is important to use the direction parameter set in the preceding processing, and a description of the remaining parameters will be omitted.

Subsequently, the control unit 701 returns the ADDTS response frame to the source address (the MAC address of the terminal station to which the ADDTS response frame should be returned) contained in the ADDTS request frame (header) through the wireless LAN communication unit 704. Assume that the request from the terminal station is for an uplink. Even in this case, if entry terminal stations are to perform transmission/reception, the base station sets a direct link as a proposal from the self-station and returns an ADDTS response frame.

In step S1113, the control unit 701 determines whether the processing is to be interrupted due to an error or the stoppage of the wireless LAN communication function. If YES in step S1113, the processing is terminated. If NO in step S1113, the process returns to step S1101 to repeat the above processing.

[DLS Processing]

The processing of making the base station 601 process a DLS request frame and DLS response frame from a terminal station and perform control concerning the establishment of a direct link will be described next with reference to FIG. 12.

Figure 12:
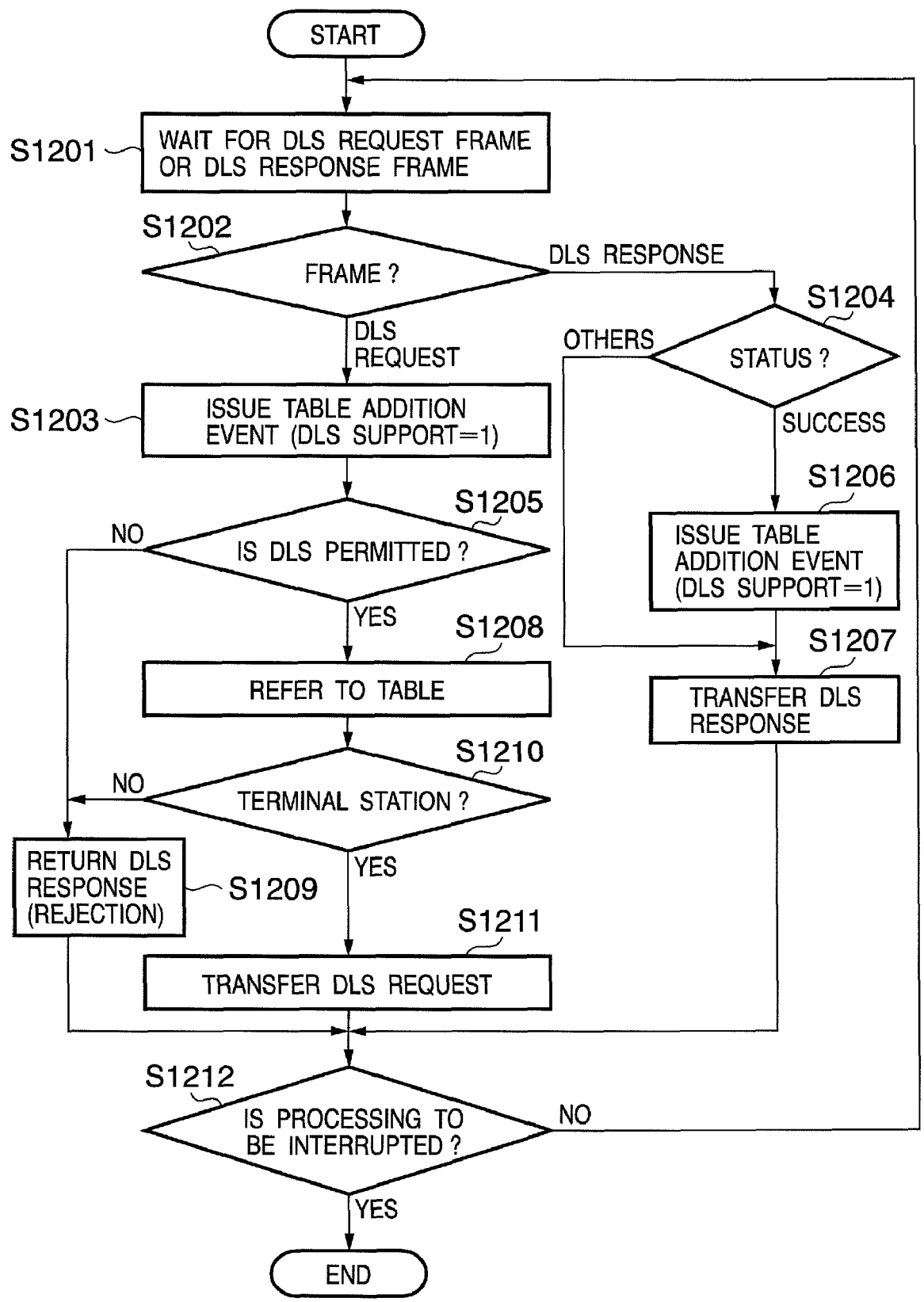
FIG. 12 is a flowchart showing DLS processing in a base station in the first embodiment.

FIG. 12 is a flowchart showing DLS processing in a base station in the first embodiment. The control unit 701 of the base station 601 executes this processing at the time of initialization of the wireless LAN communication function following the start of ADDTS processing.

First of all, when the control unit 701 starts DLS processing, the process shifts to step S1201 to wait for the reception of a DLS request frame or DLS response frame from a terminal station through the wireless LAN communication unit 704. When the base station receives one of such frames, the process shifts to step S1202 to discriminate the frame. If the base station has received a DLS request frame, the process shifts to step S1203 to issue the table addition event 801 with respect to table processing. More specifically, the control unit 701 sets the source address (the MAC address of the terminal station which has transmitted the DLS request frame) contained in the DLS request frame (header) in the MAC address field, and sets "1 (present)" in the DLS support field. The control unit 701 performs this processing to determine that the terminal station which has transmitted the DLS request frame supports DLS and reflect the corresponding information in the table 803.

In step S1205, the control unit 701 determines whether the self-station permits DLS. If YES in step S1205, the process shifts to step S1208 to refer to the table 803 created by table processing. In step S1210, the control unit 701 then determines whether the partner terminal station has been entered in the table 803. In this case, the control unit 701 searches for an entry having the same MAC address member as that of the destination address (the MAC address of the terminal station to which the DLS request frame should be transferred) contained in the DLS request frame (header). If the control unit 701 determines as a result of the search that the station has been entered, the control unit 701 determines that the station is an entry terminal station. The process then shifts to step S1211. The control unit 701 performs this processing to check whether the MAC address designated as a partner terminal station of the direct link is really the MAC address of the terminal station which the base station accommodates. In step S1211, the control unit 701 transfers the DLS request frame to the destination address contained in the DLS request frame (header) through the wireless LAN communication unit 704.

If the control unit 701 does not permit DLS in step S1205, or determines in step S1210 that the station is not an entry terminal station, the process shifts to step S1209. In step S1209, the control unit 701 transfers the DLS response frame indicating rejection to the source address (the MAC address of the terminal station to which the DLS response frame should be returned) contained in the DLS request frame (header) via the wireless LAN communication unit 704.

If the base station receives a DLS response frame in step S1202 described above, the process shifts to step S1204 to analyze the status code contained in the DLS response frame.

In this case, if the status code indicates success, the process shifts to step S1206 to issue the table addition event 801 with respect to table processing. More specifically, the control unit 701 sets the source address (the MAC address of the terminal station which has transmitted the DLS response frame) contained in the DLS response frame (header) in the MAC address field, and sets "1 (present)" in the DLS support field. That is, the control unit 701 performs this processing to determine that the terminal station which has transmitted the DLS response frame indicating permission supports DLS and reflects the corresponding information in the table 803.

If it is determined in step S1204 that the status code indicates others instead of success, the process shifts to step S1207. In step S1207, the control unit 701 transfers the DLS response frame to the destination address (the MAC address of the terminal station to which the DLS response frame should be transferred) contained in the DLS response frame (header) through the wireless LAN communication unit 704.

When the control unit 701 completes the above processing for the DLS request frame and DLS response frame, the process shifts to step S1212 to determine whether to interrupt the processing due to an error or the stoppage of the LAN communication function. In this case, if it is determined that the processing should be interrupted, the processing is terminated. Otherwise, the process returns to step S1201 to repeat the above processing.

[ADDTS Processing (Terminal Station)]

Processing associated with an ADDTS request frame transmitted by the terminal station 602 and the processing of performing control associated with QoS securement in data transmission/reception with respect to an ADDTS response frame transmitted by the base station 601 will be described next with reference to FIG. 13. The terminal station 603 performs this processing in the same manner.

Figure 13:
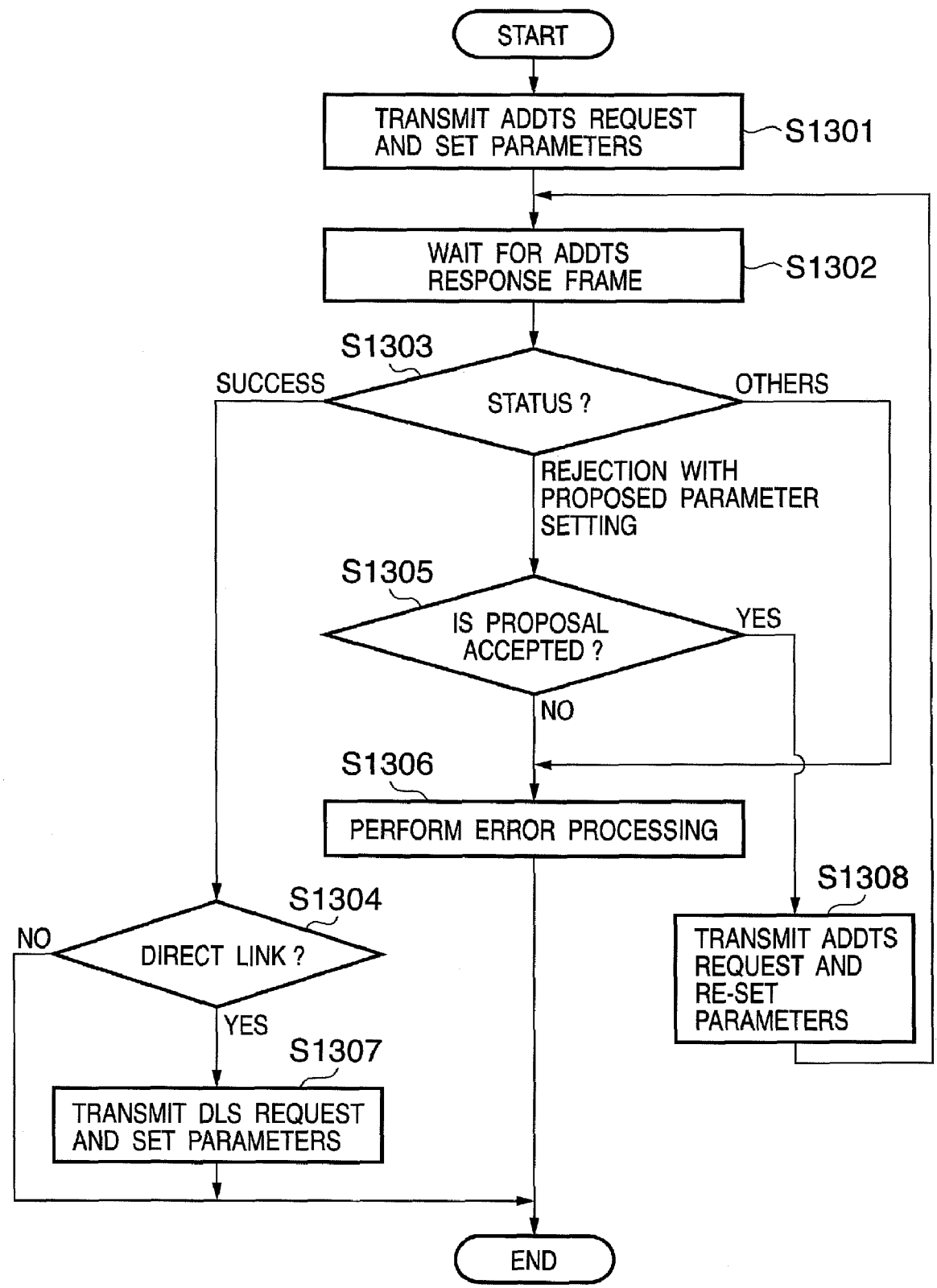
FIG. 13 is a flowchart showing ADDTS processing in a terminal station in the first embodiment.

FIG. 13 is a flowchart showing ADDTS processing in a terminal station in the first embodiment. The control unit 711 executes this processing when the terminal station 602 is to perform data transmission/reception requiring QoS securement. Note that the MAC address of a data transmission/reception partner is known.

First of all, when the control unit 711 starts ADDTS processing, the process shifts to step S1301 to transmit an ADDTS request frame to the base station 601 through the wireless LAN communication unit 714. This ADDTS request frame contains a TCLAS element and is set with parameters in accordance with the flow of data which the self-station will transmit or receive. Note that "Classifier Type" in the frame classifier field of the TCLAS element is set to the Ethernet (registered trademark) type. In addition, the source address is set to the MAC address of the self-station, and the destination address is set to the MAC address of the data transmission/reception partner. In this case, the control unit 711 transmits the ADDTS request frame containing the TCLAS element and expects that the base station 601 will return an ADDTS response frame which proposes optimal settings.

In step S1302, the control unit 711 waits for the reception of an ADDTS response frame from the base station 601 through the wireless LAN communication unit 714. Thereafter, when the control unit 711 receives an ADDTS response frame, the process shifts to step S1303 to analyze the status code contained in the frame and branch the process in accordance with the analysis result. First of all, if the status code indicates success, the process shifts to step S1304 to analyze the direction parameter of the TSPEC element contained in the ADDTS response frame and determine whether a direct link is set. If no direct link is set, this processing is terminated. If a direct link is set, the process shifts to step S1307.

In step S1307, the control unit 711 sets parameters for the DLS request frame and transmits the frame to the base station 601 through the wireless LAN communication unit 714. Note that the control unit 711 sets the source MAC address to the MAC address of the self-station, and the destination MAC address to the destination address in the frame classifier field of the TCLAS element contained in the ADDTS response frame. A description of setting of other parameters will be omitted. In this case, since QoS securement for data transmission/reception via a direct link is performed, the control unit 711 transmits a DLS request frame to actually establish a direct link.

In the first embodiment, a direct link is established after QoS is secured. However, the present invention is not limited to this. For example, only when the self-station transmits an ADDTS request frame set to an uplink and changes the uplink to a direct link in accordance with a proposal from the base station 601, and QoS is secured upon application of the proposal, a direct link may be established thereafter. In addition, the control unit 711 may additionally perform the processing of determining whether a direct link has already been established with a partner terminal station with which a direct link is to be established, as needed.

If the control unit 711 determines in step S1303 that although the status code indicates rejection, parameter setting is proposed from the base station 601, the process shifts to step S1305. In step S1305, the control unit 711 determines whether to accept the parameter setting proposed from the base station 601. If YES in step S1305, the process shifts to step S1308 to set parameters for the ADDTS request frame in accordance with the parameter setting containing the TCLAS element and proposed from the base station 601. The control unit 711 then transmits the ADDTS request frame to the base station 601 via the wireless LAN communication unit 714. The process then returns to step S1302. That is, the control unit 711 accepts the proposal from the base station 601 and transmits the ADDTS request frame for securing QoS by applying the proposal to the base station 601.

If the control unit 711 determines in step S1303 that the status code is other than the above code, or determines in step S1305 that it does not accept the proposal from the base station 601, the process shifts to step S1306. In step S1306, the control unit 711 performs error processing (e.g., stopping data transmission/reception requiring QoS securement or notifying the user of an error) when QoS is not secured, thereby terminating the processing.

[DLS Processing (Terminal Station)]

The processing of making a terminal station process a DLS request frame transferred from the base station 601 and a returned or transferred DLS response frame and performing control associated with the establishment of a direct link will be described with reference to FIG. 14. Although the terminal station 602 will be exemplified below, this processing is also performed in the terminal station 603 in the same manner.

Figure 14:
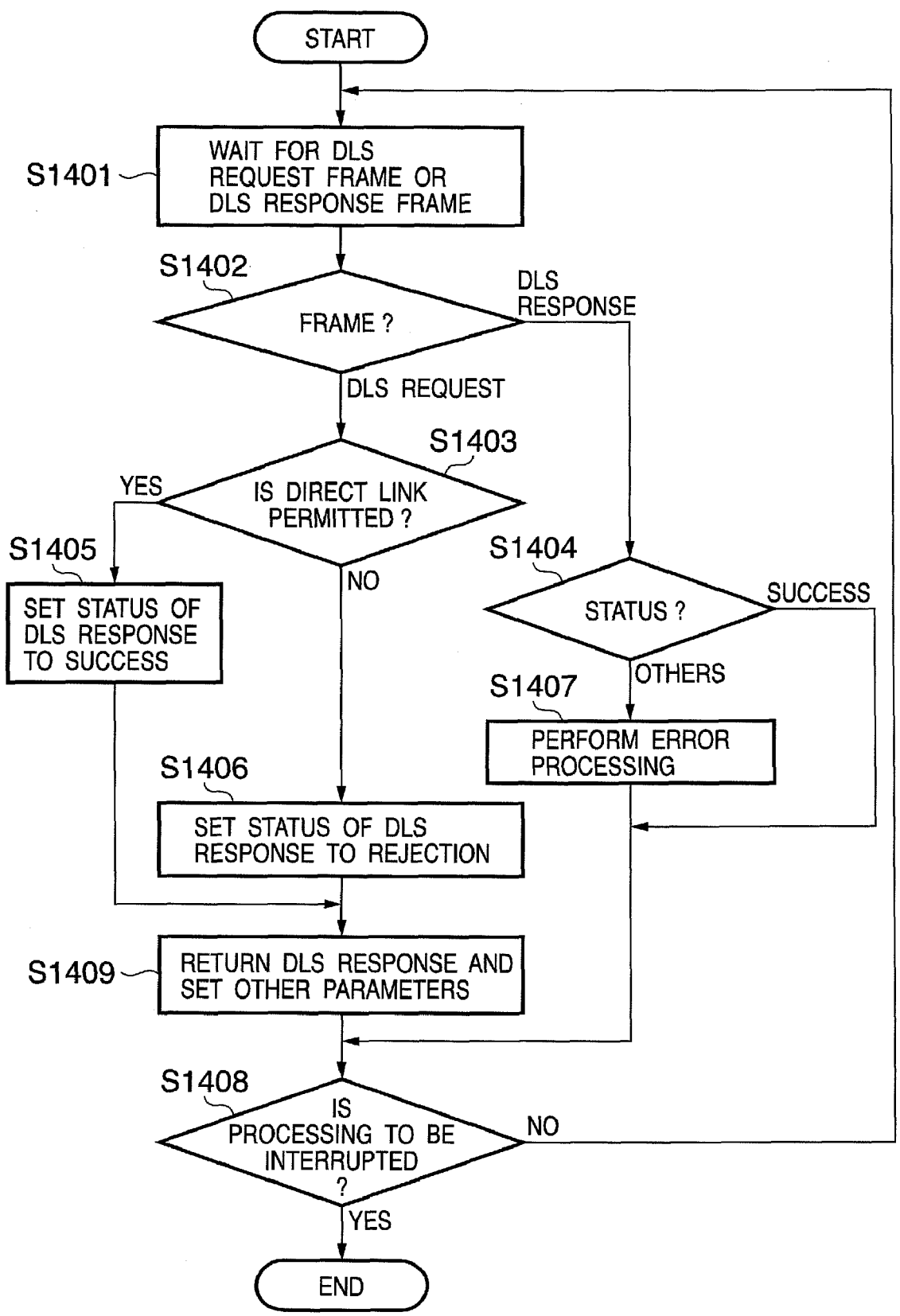
FIG. 14 is a flowchart showing DLS processing in a terminal station in the first embodiment.

FIG. 14 is a flowchart showing DLS processing in a terminal station in the first embodiment. The control unit 711 of the terminal station 602 executes this processing at the time of initialization of the wireless LAN communication function.

First of all, when the control unit 711 starts DLS processing, the process shifts to step S1401 to wait for the reception of a DLS request frame or DLS response frame from the base station 601 via the wireless LAN communication unit 714. When the control unit 711 receives one of these frames, the process shifts to step S1402 to discriminate the received frame. If the control unit 711 receives a DLS request frame, the process shifts to step S1403 to determine whether the self-station permits DLS. If it is determined that DLS is permitted, the process shifts to step S1405 to set a status code indicating success in the status parameter of the DLS response frame to be returned to the base station 601. If it is determined that DLS is not permitted, the process shifts to step S1406 to set a status code indicating rejection in the status parameter of the DLS response frame to be returned to the base station 601.

When the setting is complete in step S1405 or S1406, the process shifts to step S1409 to set other parameters and transmit the set DLS response frame to the base station 601 via the wireless LAN communication unit 714. Note that the processing of setting other parameters is known processing, and hence a description thereof will be omitted.

In step S1408, the control unit 711 determines whether to interrupt the processing due to an error or the stoppage of the wireless LAN communication function. If YES in step S1408, the processing is terminated. If NO in step S1408, the process returns to step S1401 to repeat the above processing.

If the control unit 711 determines in step S1402 that a DLS response frame is received, the process shifts to step S1404 to analyze the status code contained in the frame. If the status code indicates success as a result of analysis, the process shifts to step S1408. If the status code does not indicate success, the process shifts to step S1407. In step S1407, the control unit 711 performs error processing (e.g., stopping data transmission/reception via a direct link or notifying the user of an error) when DLS has not succeeded. The process then shifts to step S1408 described above.

[Operation Sequence]

An example of operation to be performed when the above base station 601 and terminal stations 602 and 603 are to exchange management frames will be described below with reference to FIG. 15.

Figure 15:
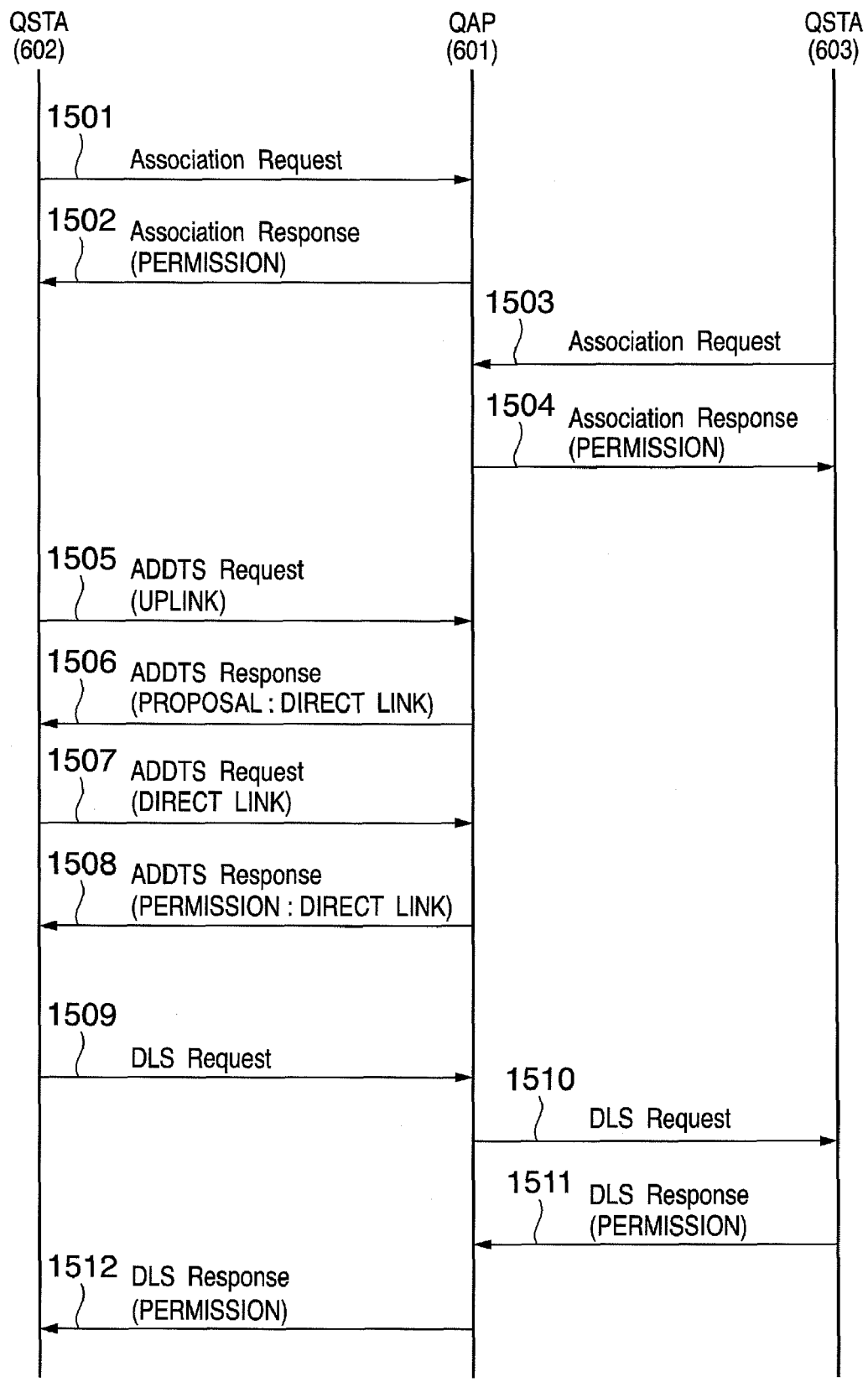
FIG. 15 is a view showing an operation sequence between the base station 601 and the terminal stations 602 and 603 in the first embodiment.

FIG. 15 is a view showing an operation sequence between the base station 601 and the terminal stations 602 and 603 in the first embodiment. First of all, the terminal station 602 transmits an association request frame 1501 to the base station 601 to make the base station 601 accommodate the terminal station 602. When permitting association from the terminal station 602, the base station 601 returns an association response frame 1502 indicating permission to the terminal station 602. The base station 601 then registers the entry of the terminal station 602 in the table 803 by table processing.

Like the terminal station 602, the terminal station 603 also transmits an association request frame 1503 to the base station 601 to make the base station 601 accommodate the terminal station 603. When permitting association from the terminal station 603, the base station 601 returns an association response frame 1504 indicating permission to the terminal station 603. The base station 601 then registers the entry of the terminal station 603 in the table 803 by table processing.

When the terminal station 602 is to perform data transmission/reception requiring QoS securement with the terminal station 603 as a data transmission/reception partner, the terminal station 602 transmits an ADDTS request frame 1505 indicating the corresponding information to the base station 601. Assume that the direction parameter of the TSPEC element is set to an uplink.

The base station 601 determines from the table 803 that the data transmission/reception partner of the terminal station 602 is the terminal station 603 which the self-station is accommodating. The base station 601 then returns, to the terminal station 602, an ADDTS response frame indicating rejection with proposed parameter setting in which the direction parameter of the TESPEC element is set to a direct link 1506.

When accepting the proposed parameter setting, the terminal station 602 transmits an ADDTS request frame 1507 in which parameters are set in accordance with the parameter setting proposed by the base station 601. This makes the base station 601 transmit an ADDTS response frame 1508 indicating permission to the terminal station 602. The base station 601 then updates the DLS support of the terminal station 602 in an entry of the table 803 by table processing.

Since QoS of a direct link is secured, the terminal station 602 transmits, to the base station 601, a DLS request frame 1509 for setting the direct link with the base station 601. With this operation, when permitting the direct link, the base station 601 transfers a DLS request frame 1510 to the terminal station 603.

When permitting the direct link, the terminal station 603 returns a DLS response frame 1511 indicating permission to the base station 601. With this operation, the base station 601 transfers a DLS response frame 1512 from the terminal station 603 to the terminal station 602. The base station 601 then updates the DLS support of the terminal station 603 in the entry of the table 803 to "1 (present)" by table processing. Subsequently, the terminal stations 602 and 603 perform data transmission/reception via the direct link.

Second Embodiment

The second embodiment of the present invention will be described in detail next with reference to the accompanying drawings. The arrangement of a wireless LAN system to which a wireless communication method according to the second embodiment is applied is the same as that of the first embodiment described with reference to FIG. 6, and hence a description thereof will be omitted. The internal arrangements of a base station 601 and terminal stations 602 and 603 are the same as those in the first embodiment described with reference to FIGS. 7A and 7B, and hence a description thereof will be omitted.

[ADDTS Processing]

The processing of making the base station 601 receive ADDTS request frames from the terminal stations 602 and 603 and performing control associated with QoS securement in data transmission/reception performed by the terminal stations will be described below with reference to FIG. 16.

Figure 16:
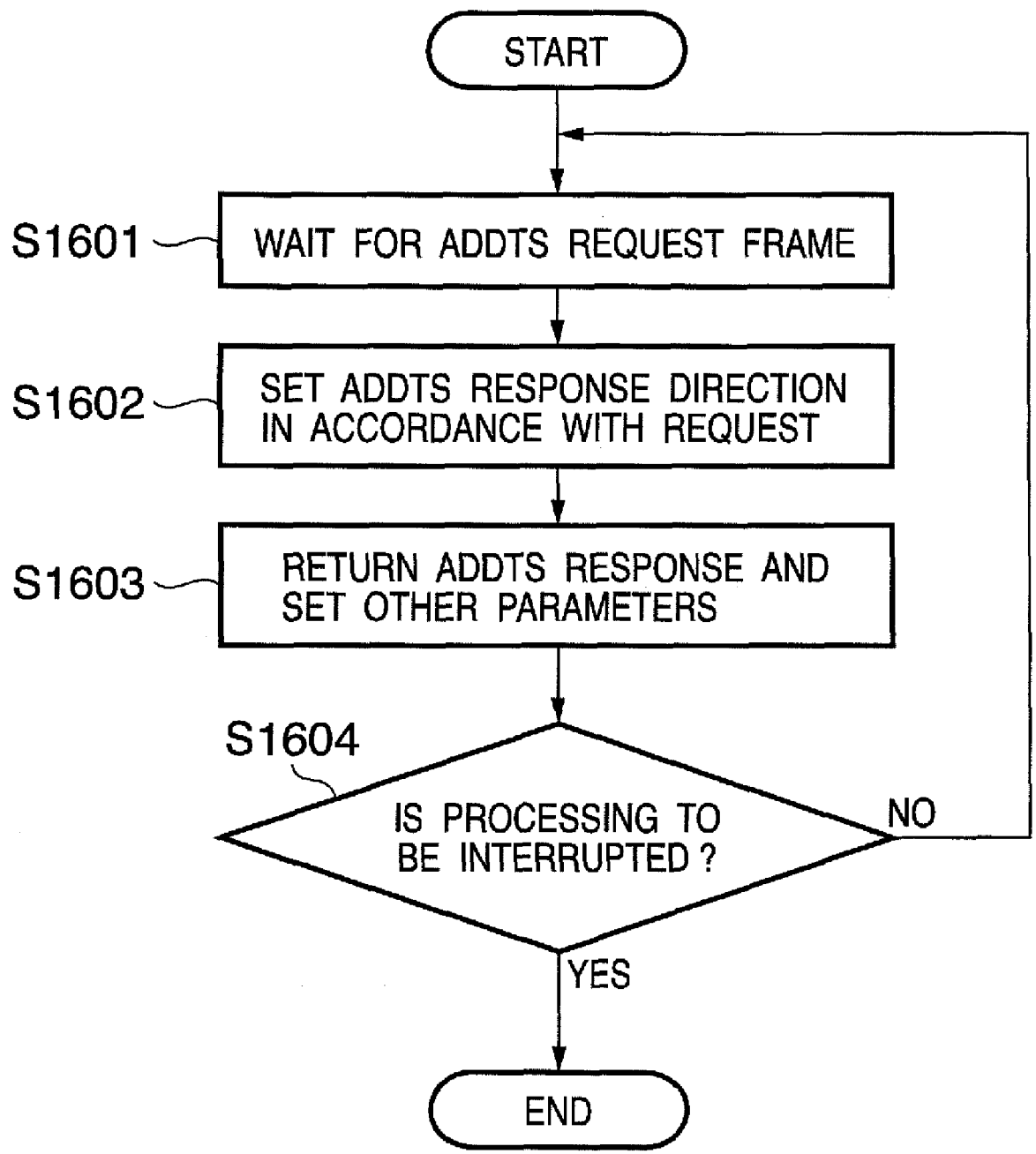
FIG. 16 is a flowchart showing ADDTS processing in a base station in the second embodiment.

FIG. 16 is a flowchart showing ADDTS processing in a base station in the second embodiment. A control unit 701 of the base station 601 executes this processing at the time of initialization of the wireless LAN communication function.

When the control unit 701 starts ADDTS processing, the process shifts to step S1601 to wait for the reception of an ADDTS request frame from each of the terminal stations 602 and 603 via a wireless LAN communication unit 704. When the control unit 701 receives such a frame, the process shifts to step S1602 to set the direction parameter of the TSPEC element contained in an ADDTS response frame to be returned, in accordance with the request contained in the ADDTS request frame transmitted from the terminal station.

In step S1603, the control unit 701 sets other parameters for the ADDTS response frame in consideration of the direction parameter set in the preceding processing and the overall traffic of the network. In this case, it is important to use the direction parameter set in the preceding processing. A detailed description of the processing will be omitted.

The control unit 701 returns the ADDTS response frame to the source address (the MAC address of the terminal station to which the ADDTS response frame should be returned) contained in the ADDTS request frame (header) via the wireless LAN communication unit 704. In this case, if, for example, the request from the terminal station is for an uplink, the control unit 701 sets other parameters on the basis of this information and returns the ADDTS response frame.

In step S1604, the control unit 701 determines whether to interrupt the processing due to an error or the stoppage of the wireless LAN communication function. If YES in step S1604, the processing is terminated. Otherwise, the process returns to step S1601 to repeat the above processing.

[DLS Processing]

The processing of making the base station 601 process a DLS request frame or DLS response frame from a terminal station and performing control associated with the establishment of a direct link will be described next with reference to FIG. 17.

Figure 17:
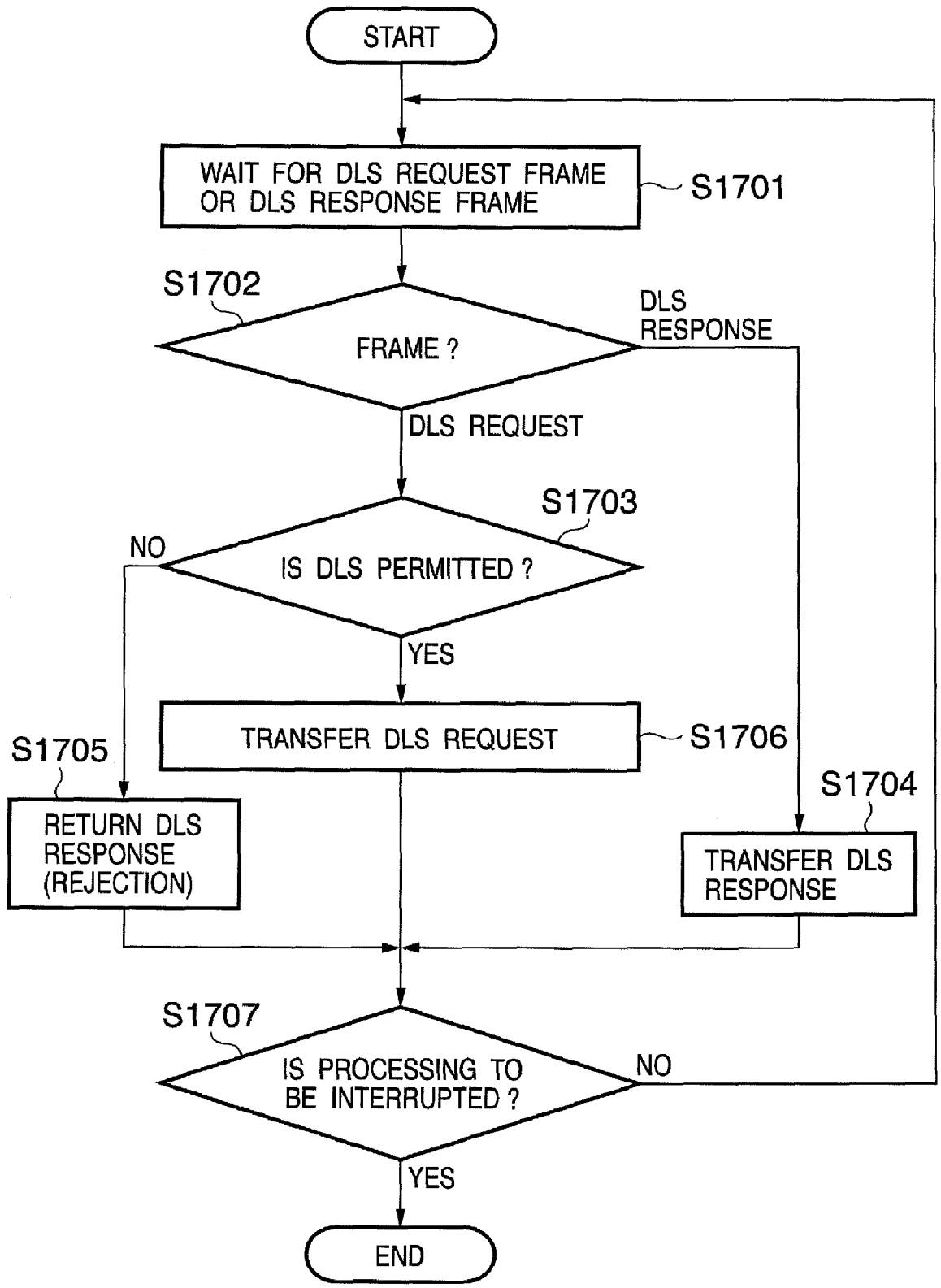
FIG. 17 is a flowchart showing DLS processing in a base station in the second embodiment.

FIG. 17 is a flowchart showing DLS processing in a base station in the second embodiment. The control unit 701 of the base station 601 executes this processing at the time of initialization of the wireless LAN communication function following the start of ADDTS processing.

First of all, when the control unit 701 starts DLS processing, the process shifts to step S1701 to wait for the reception of a DLS request frame or DLS response frame from a terminal station via the wireless LAN communication unit 704. When the control unit 701 receives either frame, the process shifts to step S1702 to discriminate the frame. When the control unit 701 receives a DLS request frame, the process shifts to step S1703 to determine whether the self-station permits DLS. If YES in step S1703, the process shifts to step S1706 to transfer the DLS request frame to the destination address contained in the DLS request frame (header) via the wireless LAN communication unit 704.

If the control unit 701 does not permit DLS, the process shifts to step S1705. In step S1705, the control unit 701 transfers a DLS response frame indicating rejection to the source address (the MAC address of the terminal station to which the DLS response frame should be returned) contained in the DLS request frame (header) via the wireless LAN communication unit 704.

If the control unit 701 determines in step S1702 that it has received a DLS response frame, the process shifts to step S1704. In step S1704, the control unit 701 transfers the DLS response frame to the destination address (the MAC address of the terminal station to which the DLS response frame should be transferred) contained in the DLS response frame (header) via the wireless LAN communication unit 704.

When the control unit 701 completes the processing for the above DLS request frame and DLS response frame, the process shifts to step S1707 to determine whether to interrupt the processing due to an error or the stoppage of the wireless LAN communication function. If YES in step S1707, the processing is terminated. If NO in step S1707, the process returns to step S1701 to repeat the above processing.

[ADDTS Processing (Terminal Station)]

Processing associated with an ADDTS request frame transmitted by the terminal station 602 and the processing of performing control associated with QoS securement in data transmission/reception with respect to an ADDTS response frame transmitted by the base station 601 will be described next with reference to FIGS. 18A and 18B. The terminal station 603 also performs this processing in the same manner.

Figure 18A:
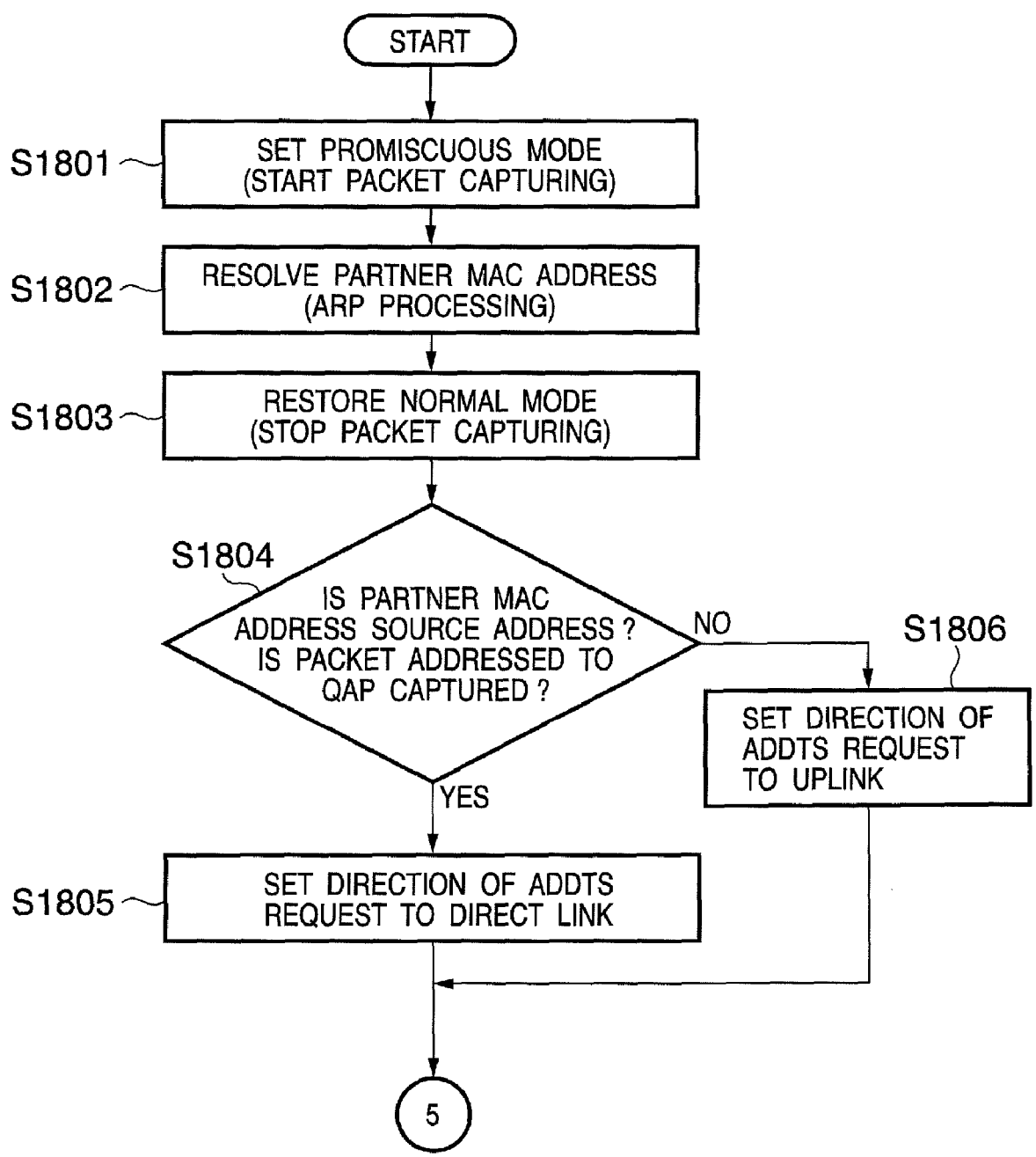
FIGS. 18A and 18B are flowcharts showing ADDTS processing in a terminal station in the second embodiment.
Figure 18B:
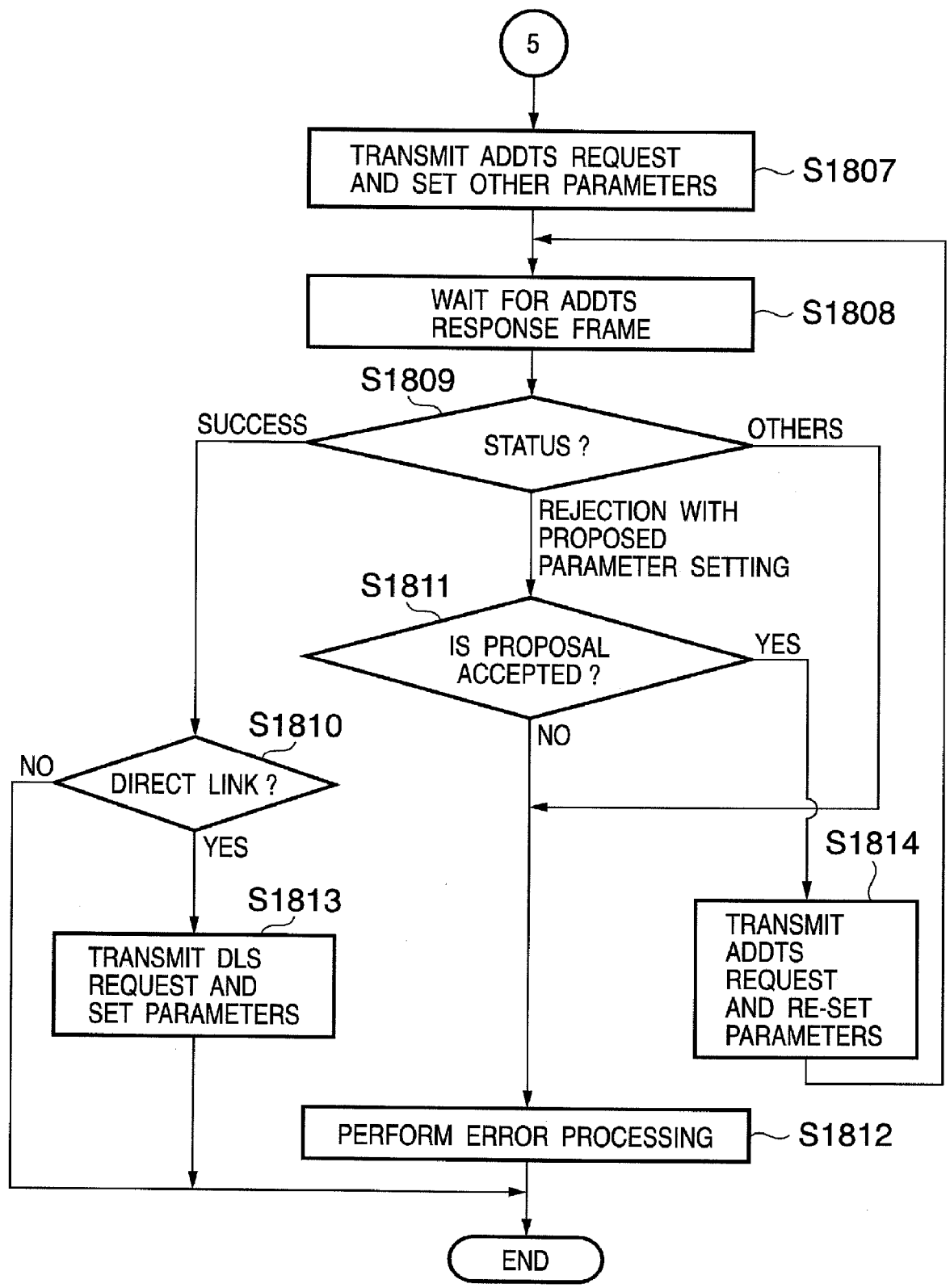

FIGS. 18A and 18B are flowcharts showing ADDTS processing in a terminal station in the second embodiment. The control unit 711 executes this processing when the terminal station 602 is to perform data transmission/reception requiring QoS securement. In this case, the IP address of a data transmission/reception partner is known.

When the control unit 711 starts ADDTS processing, the process shifts to step S1801 to set the wireless LAN chip of the self-station to the promiscuous mode (the operation mode of receiving all frames flowing on the network as well as frames addressed to the self-station). The control unit 711 then starts capturing (recording) the received frames. In this case, the control unit 711 receives all the frames flowing on the network to determine whether the data transmission/reception partner is a terminal station accommodated in the same base station.

In step S1802, the control unit 711 performs ARP processing on the basis of the IP address of the data transmission/reception partner to acquire the MAC address of the data transmission/reception partner. In this case, the control unit 711 performs ARP processing to subsequently determine whether the data transmission/reception partner is a terminal station accommodated in the same base station and to acquire a destination MAC address (the partner terminal station of a direct link) contained in a DLS request frame to be transmitted afterward.

In step S1803, the control unit 711 stops capturing frames and restores the wireless LAN chip of the self-station from the promiscuous mode to the normal mode (the operation mode of receiving frames addressed to the self-station). In step S1804, the control unit 711 determines whether there is any of the captured frames (headers) in which the source address coincides with the MAC address of the data transmission/reception partner and the reception station address coincides with the MAC address of the base station 601 with which the self-station is associated. That is, the control unit 711 determines whether there is any frame which is addressed to a BSSID (Basic Service Set Identification) via the base station 601. If the control unit 711 determines in step S1804 that there is a frame in which the source address coincides with the MAC address of the data transmission/reception partner and the reception station address coincides with the MAC address of the base station 601, the control unit 711 determines that the corresponding terminal stations are accommodated in the same base station. The process then advances to step S1805. If the data transmission/reception partner is accommodated in the same base station, performing returning operation in the above ARP processing indicates that a frame should has been transmitted, in which the reception station address coincides with the BSSID, the source address coincides with the MAC address of the data transmission/reception partner, and the destination address coincides with the MAC address of the terminal station 602.

If there is no such frame, the control unit 711 determines that the data transmission/reception partner is not an entry terminal station accommodated in the same base station. The process then shifts to step S1806 to set the direction parameter of the TSPEC element contained in the ADDTS request frame to an uplink.

In the second embodiment, a direction parameter is set to an uplink. If, however, data transmission/reception requiring QoS securement is associated with data reception by the self-station, the direction parameter is set to a downlink. In addition, if the data transmission/reception is associated with data transmission by the self-station, the direction parameter may be set to an uplink. In this case, it is important not to set the direction parameter to a direct link when the data transmission/reception partner is not an entry terminal station accommodated in the same base station.

In step S1805, since the data transmission/reception partner is a terminal station which is also accommodated in the base station 601, the control unit 711 sets the direction parameter of the TSPEC element contained in the ADDTS request frame to a direct link.

In step S1807, the control unit 711 transmits, to the base station 601 via a wireless LAN communication unit 714, the ADDTS request frame which contains a TCLAS element and for which parameters are set in accordance with the flow of data to be transmitted or received by the self-station. The control unit 711 sets "Classifier type" in the frame classifier field of the TCLAS element to an IPv4 type, the source IP address to the IP address of the self-station, and the destination IP address to the IP address of the data transmission/reception partner. In this case, if data transmission/reception is to be performed between entry terminal stations accommodated in the same base station, a direct link has been set in a direction in the preceding process.

In step S1808, the control unit 711 waits for the reception of an ADDTS response frame from the base station 601 via the wireless LAN communication unit 714. If the control unit 711 receives a frame, the process shifts to step S1809 to analyze the status code contained in the ADDTS response frame and branch the process in accordance with the analysis result. If the status code indicates success, the process shifts to step S1810 to analyze the direction parameter of the TSPEC element contained in the ADDTS response frame and determine whether a direct link is set. If it is determined that a direct link is not set, this processing is terminated. If a direct link is set, the process shifts to step S1813.

In step S1813, the control unit 711 sets parameters for a DLS request frame and transmits the frame to the base station 601 via the wireless LAN communication unit 714. Note that the control unit 711 sets the source MAC address to the MAC address of the self-station, and the destination MAC address to the destination address of the frame classifier field of the TCLAS element contained in the ADDTS response frame. A description of setting other parameters will be omitted. In this case, since QoS is secured for data transmission/reception via a direct link, the control unit 711 transmits a DLS request frame to actually establish a direct link.

In the second embodiment, a direct link is established after QoS is secured. However, the present invention is not limited to this. For example, the control unit 711 may establish a direct link in advance by transmitting a DLS request frame before transmitting an ADDTS request frame immediately after determining that the data transmission/reception partner is an entry terminal station accommodated in the same base station. In addition, the control unit 711 may additionally perform the processing of determining whether a direct link has already been established with a partner terminal station with which a direct link is to be established, as needed.

If the control unit 711 determines in step S1809 that although the status code indicates rejection, and parameter setting is proposed from the base station 601, the process shifts to step S1811. In step S1811, the control unit 711 determines whether to accept the parameter setting proposed from the base station 601. If YES in step S1811, the process shifts to step S1814 to set parameters for the ADDTS request frame in accordance with the parameter setting containing the TCLAS element and proposed from the base station 601. The control unit 711 then transmits the ADDTS request frame to the base station 601 via the wireless LAN communication unit 714. The process then returns to step S1808. That is, the control unit 711 accepts the proposal from the base station 601 and transmits the ADDTS request frame for securing QoS by applying the proposal to the base station 601.

If the control unit 711 determines in step S1809 that the status code is other than the above code, or determines in step S1811 that it does not accept the proposal from the base station 601, the process shifts to step S1812. In step S1812, the control unit 711 performs error processing (e.g., stopping data transmission/reception requiring QoS securement or notifying the user of an error) when QoS is not secured, thereby terminating the processing.

[DLS Processing (Terminal Station)]

The processing of making the terminal station 602 process a DLS request frame transferred from the base station 601 and a returned or transferred DLS response frame and performing control associated with the establishment of a direct link is the same as in the first embodiment (FIG. 14), and hence a description thereof will be omitted.

[Operation Sequence]

An example of operation to be performed when the above base station 601 and terminal stations 602 and 603 are to exchange management frames will be described below with reference to FIG. 19.

Figure 19:
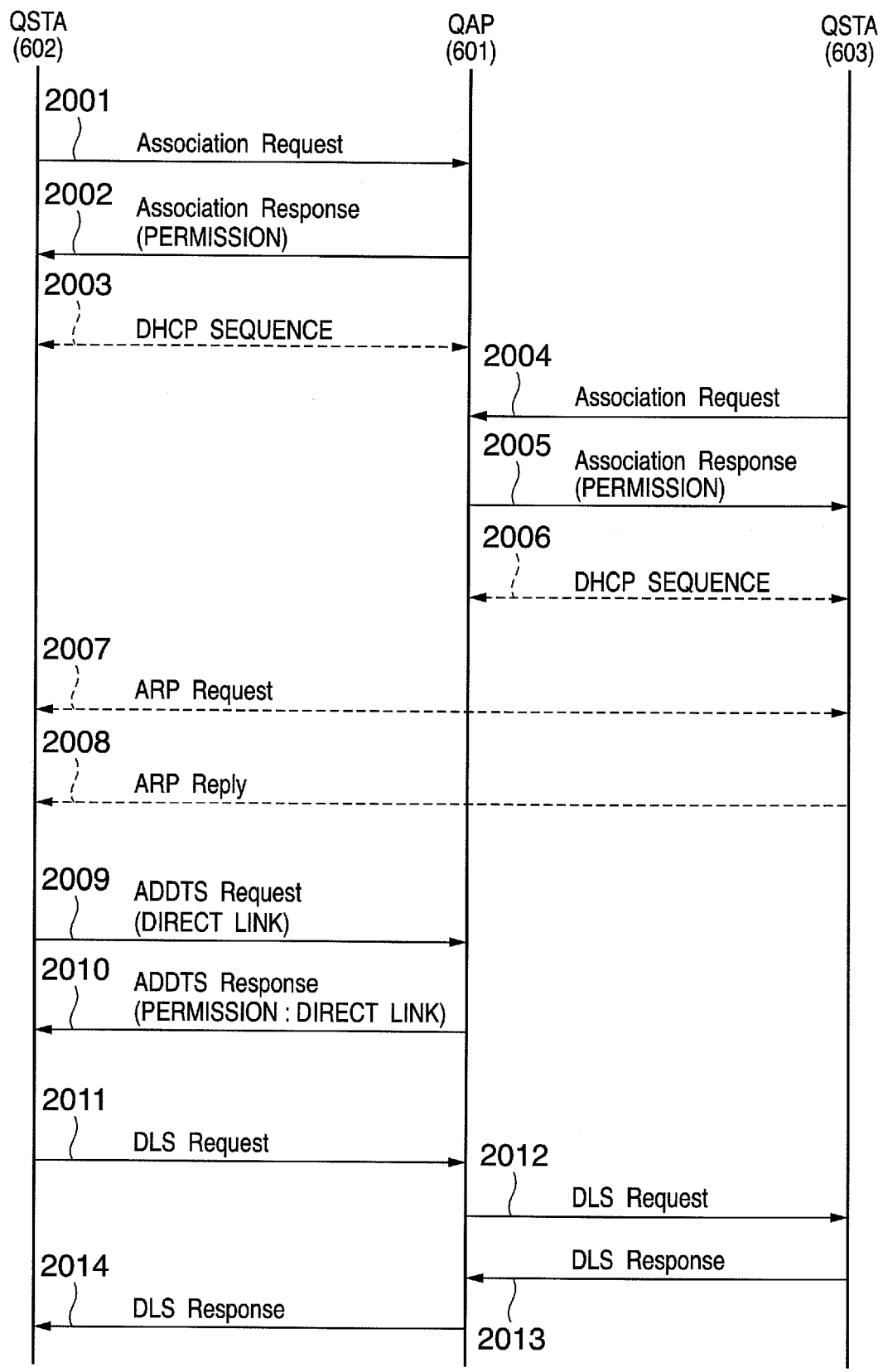
FIG. 19 is a view showing an operation sequence between a base station 601 and terminal stations 602 and 603 in the second embodiment.

FIG. 19 is a view showing an operation sequence between the base station 601 and the terminal stations 602 and 603 in the second embodiment. First of all, the terminal station 602 transmits an association request frame 2001 to the base station 601 to make the base station 601 accommodate the terminal station 602. When permitting association with the terminal station 602, the base station 601 returns an association response frame 2002 indicating permission to the terminal station 602.

In this case, a DHCP sequence 2003 for assigning an IP address to the terminal station 602 is exchanged as a wireless LAN data frame between the terminal station 602 and the base station 601, thereby assigning the IP address to the terminal station 602. DHCP stands for Dynamic Host Configuration Protocol. This processing is based on the assumption that the terminal station 602 has the function of a DHCP client, and a function existing in the base station 601 or the wired LAN connected to the base station 601 has the function of a DHCP server.

Like the terminal station 602, the terminal station 603 transmits an association request frame 2004 to the base station 601 to make the base station 601 accommodate the terminal station 603. In this case, if the base station 601 permits association with the terminal station 603, and returns an association response frame 2005 indicating permission to the terminal station 603.

In this case, the terminal station 603 and the base station 601 exchange a DHCP sequence 2006 as a wireless LAN data frame which is used to assign an IP address to the terminal station 603, thereby assigning an IP address to the terminal station 603. This operation is based on the assumption that the terminal station 603 has the function of an DHCP client like the terminal station 602.

When the terminal station 602 is to perform data transmission/reception requiring QoS securement with the terminal station 603 as a data transmission/reception partner, the control unit 711 transmits an ARP request 2007 as a wireless LAN data frame which is used to resolve the MAC address of the terminal station 603.

The terminal station 603 transmits an ARP response 2008 to the terminal station 602 as a response to the ARP request transmitted by the terminal station 602.

In this case, the terminal station 602 recognizes that the terminal station 603 as a data transmission/reception partner is a terminal station accommodated in the same base station 601. The terminal station 602 then transmits, to the base station 601, an ADDTS request frame 2009 in which the direction parameter of the TSPEC element is set to a direct link. The base station 601 returns an ADDTS response frame 2010 indicating permission to the terminal station 602.

Since QoS is secured for a direct link, the terminal station 602 transmits, to the base station 601, a DLS request frame 2011 for setting a direct link with the base station 601. With this operation, when permitting a direct link, the base station 601 transfers a DLS request frame 2012 to the terminal station 603.

When permitting the direct link, the terminal station 603 returns a DLS response frame 2013 permitting permission to the base station 601. With this operation, the base station 601 transfers a DLS response frame 2014 from the terminal station 603 to the terminal station 602. Subsequently, the terminal stations 602 and 603 perform direct data transmission/reception.

Other Embodiment

Obviously, the object of the present invention can be achieved by replacing the above function with another wireless communication function including a switching control method of implementing the functions of the above embodiments and a control method for QoS securement. For example, switching control is not limited to switching control in the communication scheme which allows communication via a base station or a control station equivalent to the base station and direct communication between terminal stations, and may be switching control between different communication schemes.

In addition, control for QoS securement may be another type of communication quality guarantee control such as QoS securement control in UPnP (Universal Plug and Play).

The object of the present invention is achieved even by supplying a recording medium storing software program codes for implementing the functions of the above embodiments to a system or apparatus, and causing the computer (or a CPU or an MPU) of the system or apparatus to read out and execute the program codes stored in the recording medium.

In this case, the program codes read out from the recording medium implement the functions of the above embodiments by themselves, and the recording medium storing the program codes constitutes the present invention.

As a recording medium for supplying the program codes, for example, a flexible disk, hard disk, optical disk, magneto-optical disk, CD-ROM, CD-R, magnetic tape, nonvolatile memory card, ROM, or DVD can be used.

The functions of the above embodiments are implemented not only when the readout program codes are executed by the computer but also when the OS (Operating System) running on the computer performs part or all of actual processing on the basis of the instructions of the program codes.

The functions of the above embodiments are also implemented when the program codes read out from the recording medium are written in the memory of a function expansion board inserted into the computer or a function expansion unit connected to the computer, and the CPU of the function expansion board or function expansion unit performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-367193, filed Dec. 20, 2005, which is hereby incorporated by reference herein in its entirety.

What is claimed is:

1. A communication apparatus comprising:
a reception unit that receives, from a first communication device, a request for direct communication between the first communication device and a second communication device;
a management unit that manages, as history information, to have a function that the first communication device communicates directly with the second communication device without the communication apparatus in accordance with the request of the direct communication received from the first communication device by the reception unit;
a determination unit that, when a request for communication with the first communication device is newly received from a third communication device, determines whether or not the communication apparatus accommodates both the first communication device and the third communication device, and determines whether or not the first communication device has the function based on the history information managed by the management unit; and
a selection unit that selects, based on a determination result by the determination unit, either the direct communication between the first communication device and the third communication device or the communication with the first communication device via the communication apparatus to instruct the third communication device to perform the selected communication,
wherein the reception unit, the management unit, determination unit and selection unit are partially implemented by at least one processor.

2. The apparatus according to claim 1, wherein the reception unit receives, from the first communication device, a request for communication bands between the first communication device and the second communication device with the request for the direct communication between the first communication device and a second communication device.

3. The apparatus according to claim 1, further comprising a response unit that responds to the third communication device so as to perform the communication with the first communication device via the communication apparatus selected by the selection unit even if the request for the direct communication between the first communication device and the third communication device is received from the third communication device.

4. A communication method of a communication apparatus comprising:
receiving, from a first communication device, a request for direct communication between the first communication device and a second communication device;
managing, as history information, to have a function that the first communication device communicates directly with the second communication device without the communication apparatus in accordance with the request of the direct communication received from the first communication device in the receiving step;
when a request for communication with the first communication device is newly received from a third communication device, determining whether or not the communication apparatus accommodates the first communication device and the third communication device, and determining whether or not the first communication device has the function based on the history information managed in the managing step; and
selecting, based on a determination result in the determining step, either the direct communication between the first communication device and the third communication device or the communication with the first communication device via the communication apparatus to instruct the third communication device to perform the selected communication.

5. A non-transitory computer-readable recording medium on which a program for causing a computer to execute a communication method defined in claim 4 is recorded.

* * * * *